Aug. 2, 1966  E. F. KLEINSCHMIDT ET AL  3,264,409
COINCIDENCE DETECTION APPARATUS
Original Filed July 24, 1959  22 Sheets-Sheet 1
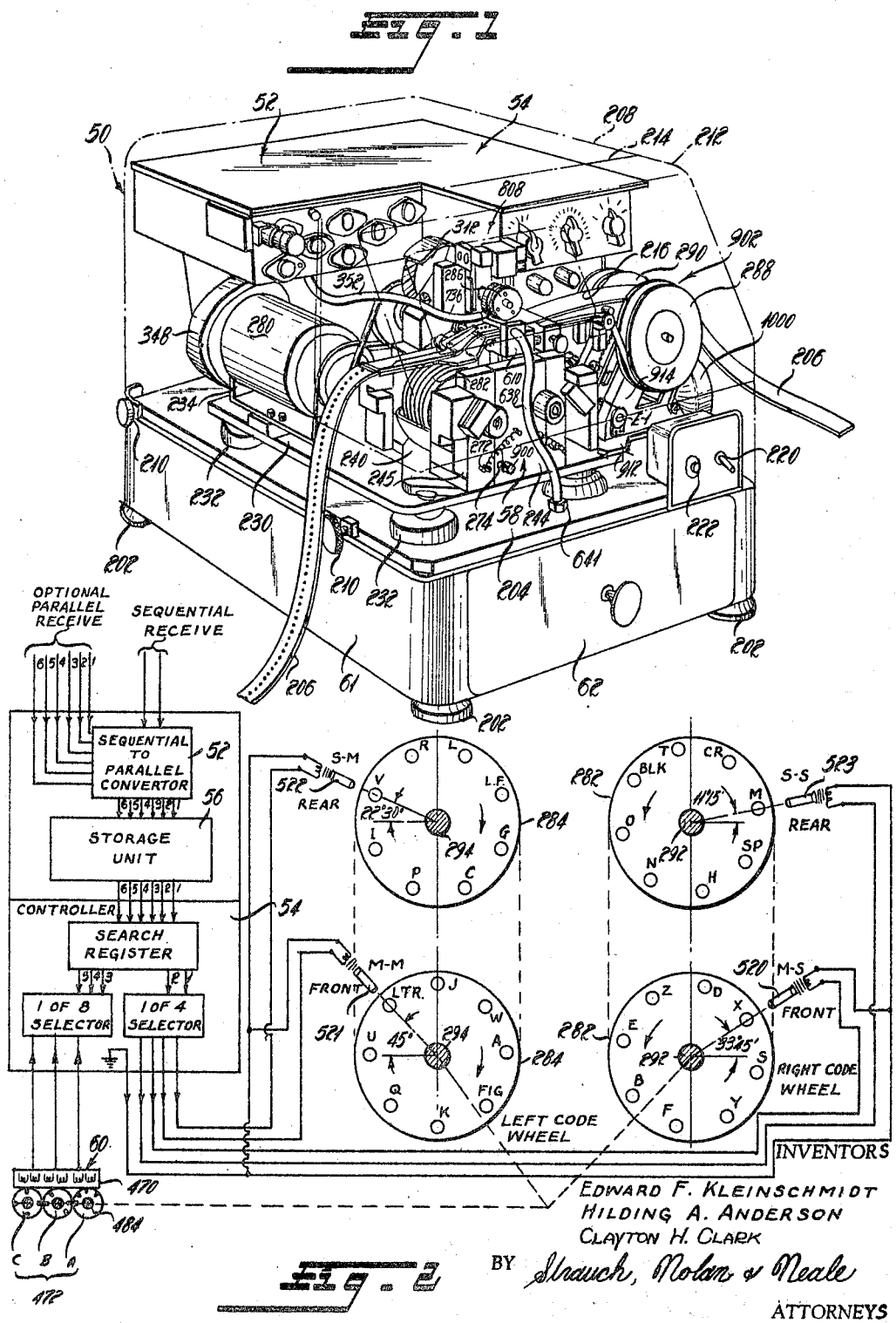
INVENTORS
EDWARD F. KLEINSCHMIDT
HILDING A. ANDERSON
CLAYTON H. CLARK
BY Strauch, Nolan & Neale
ATTORNEYS

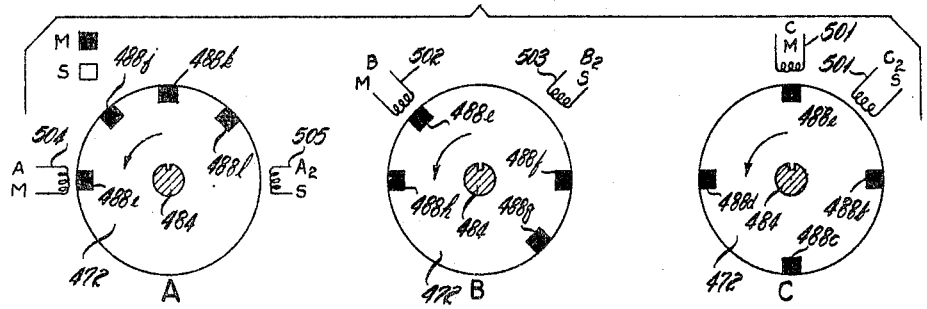

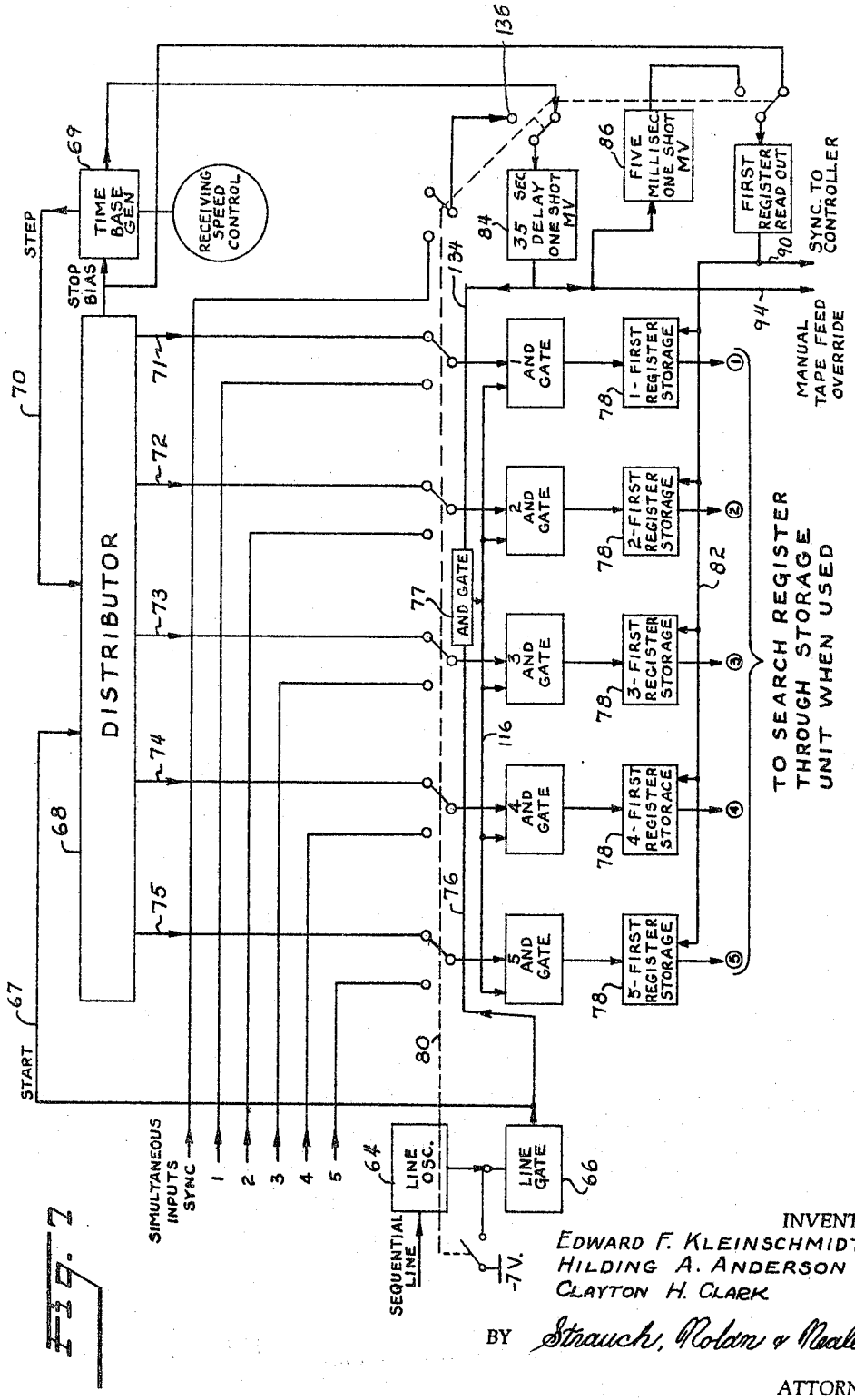

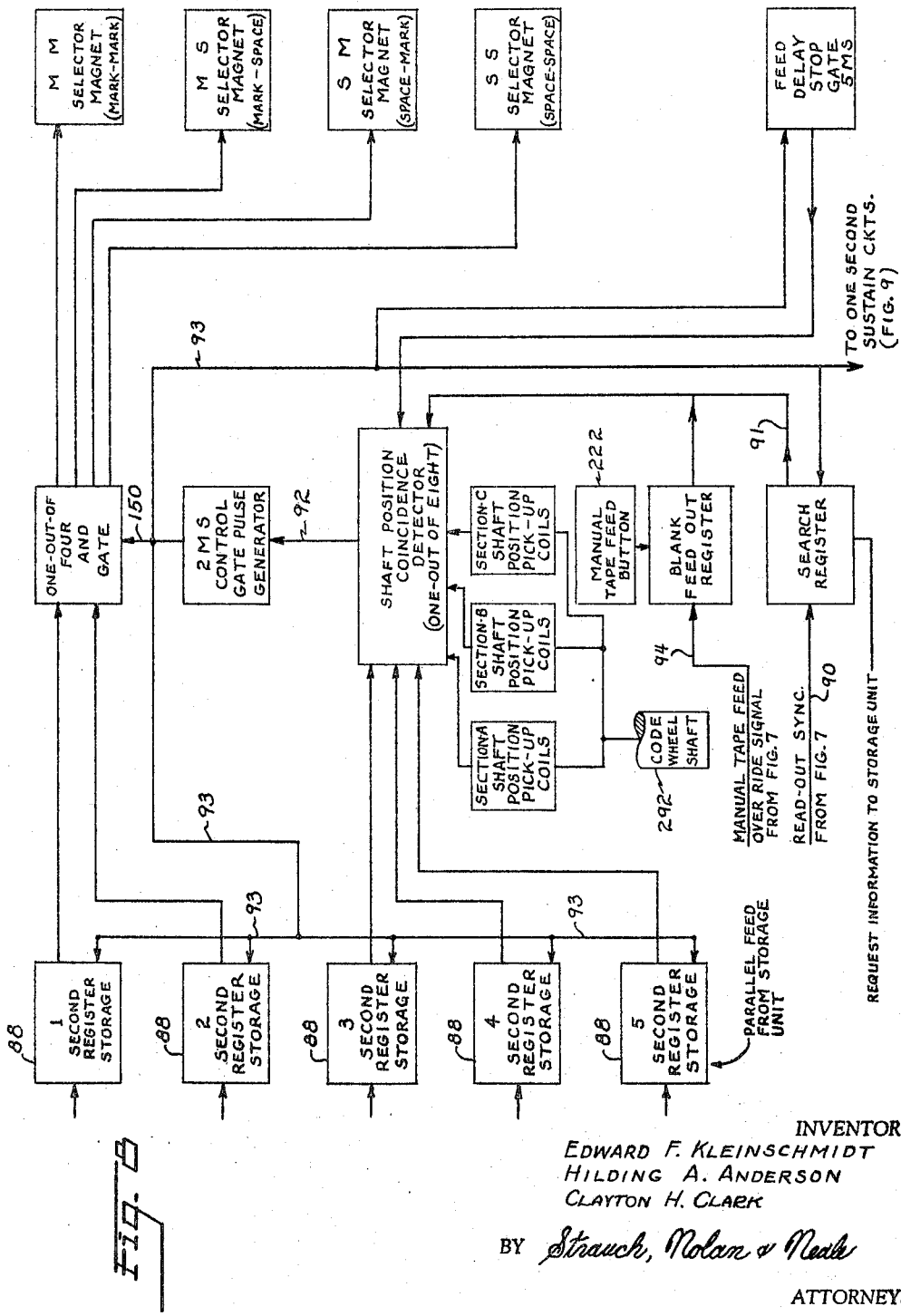

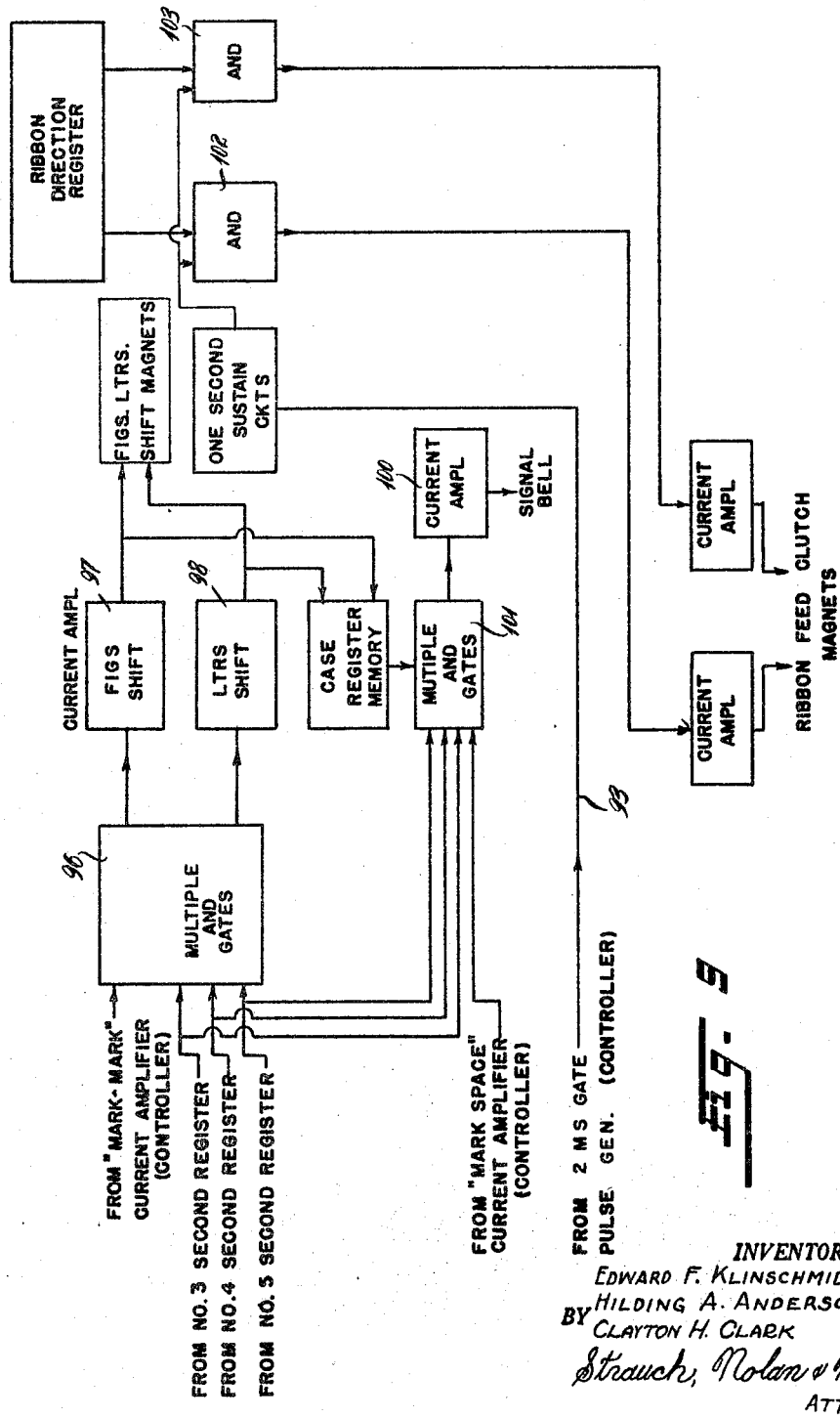

INVENTORS
EDWARD F. KLEINSCHMIDT
HILDING A. ANDERSON
CLAYTON H. CLARK

BY Strauch, Nolan & Neale

ATTORNEYS

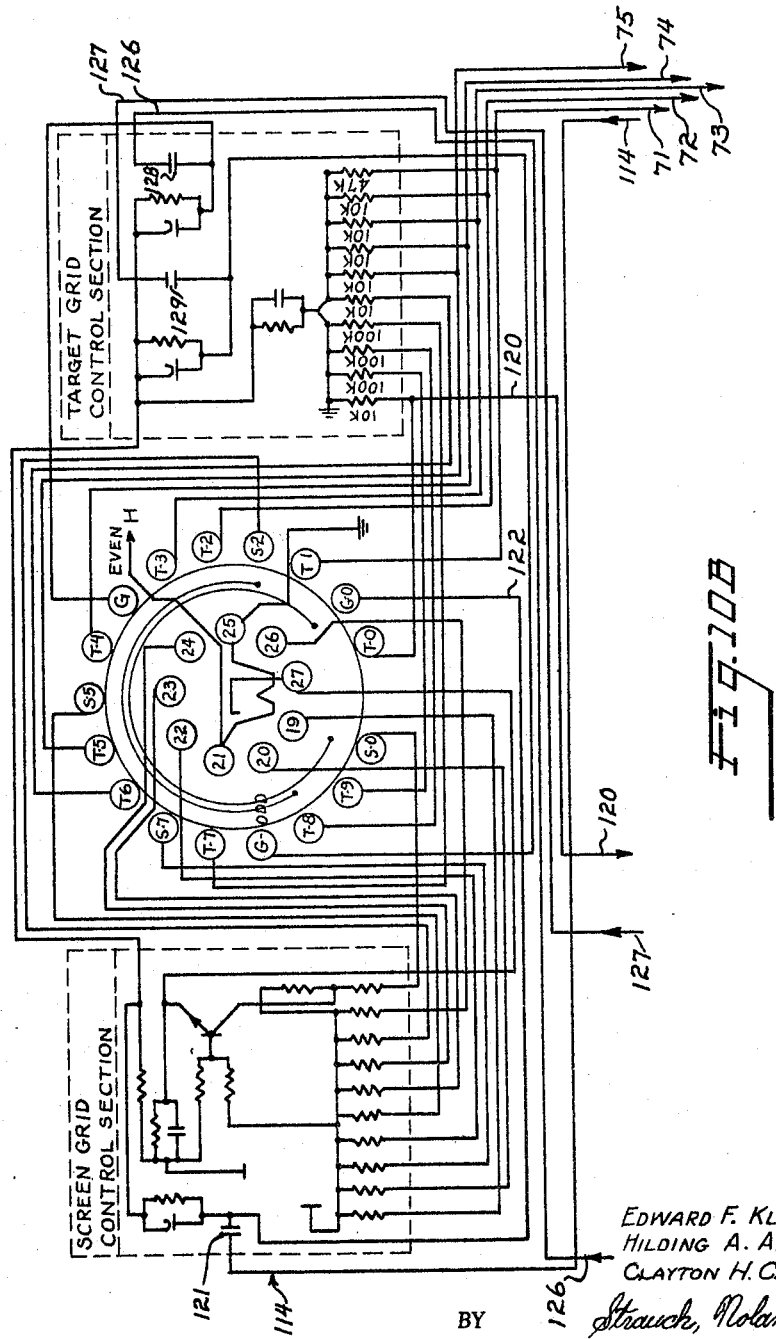

INVENTORS
EDWARD F. KLEINSCHMIDT
HILDING A. ANDERSON
CLAYTON H. CLARK

BY Strauch, Nolan & Neale

ATTORNEYS

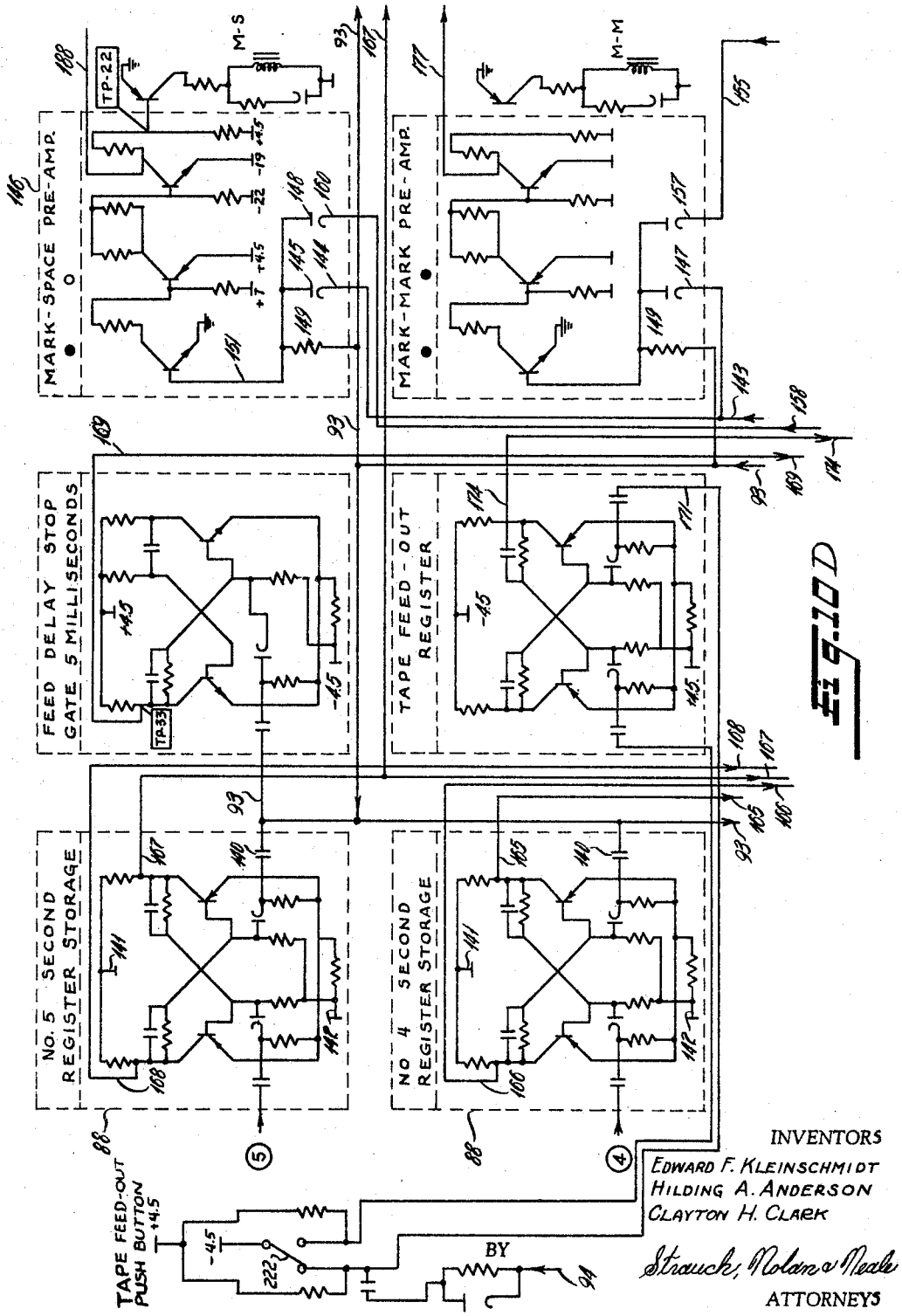

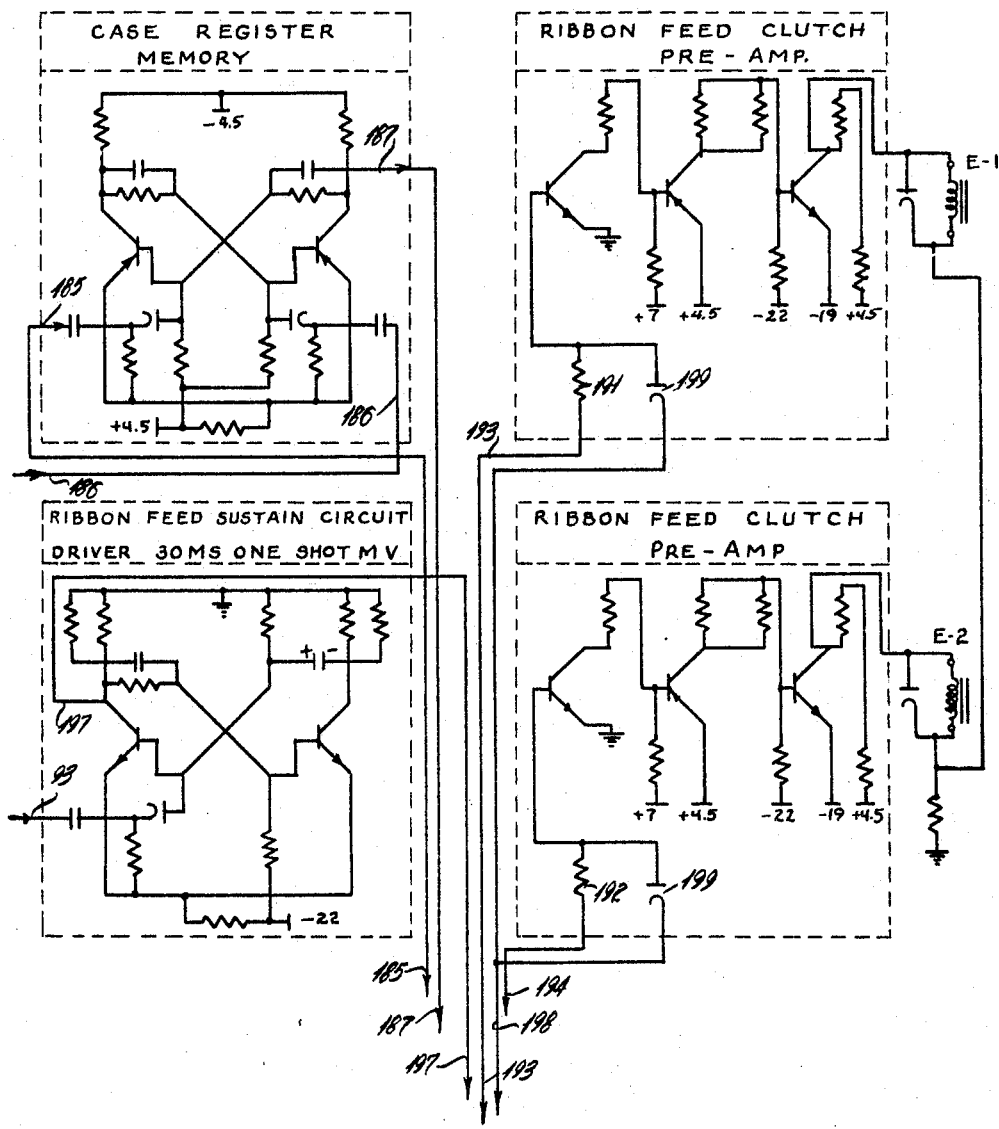

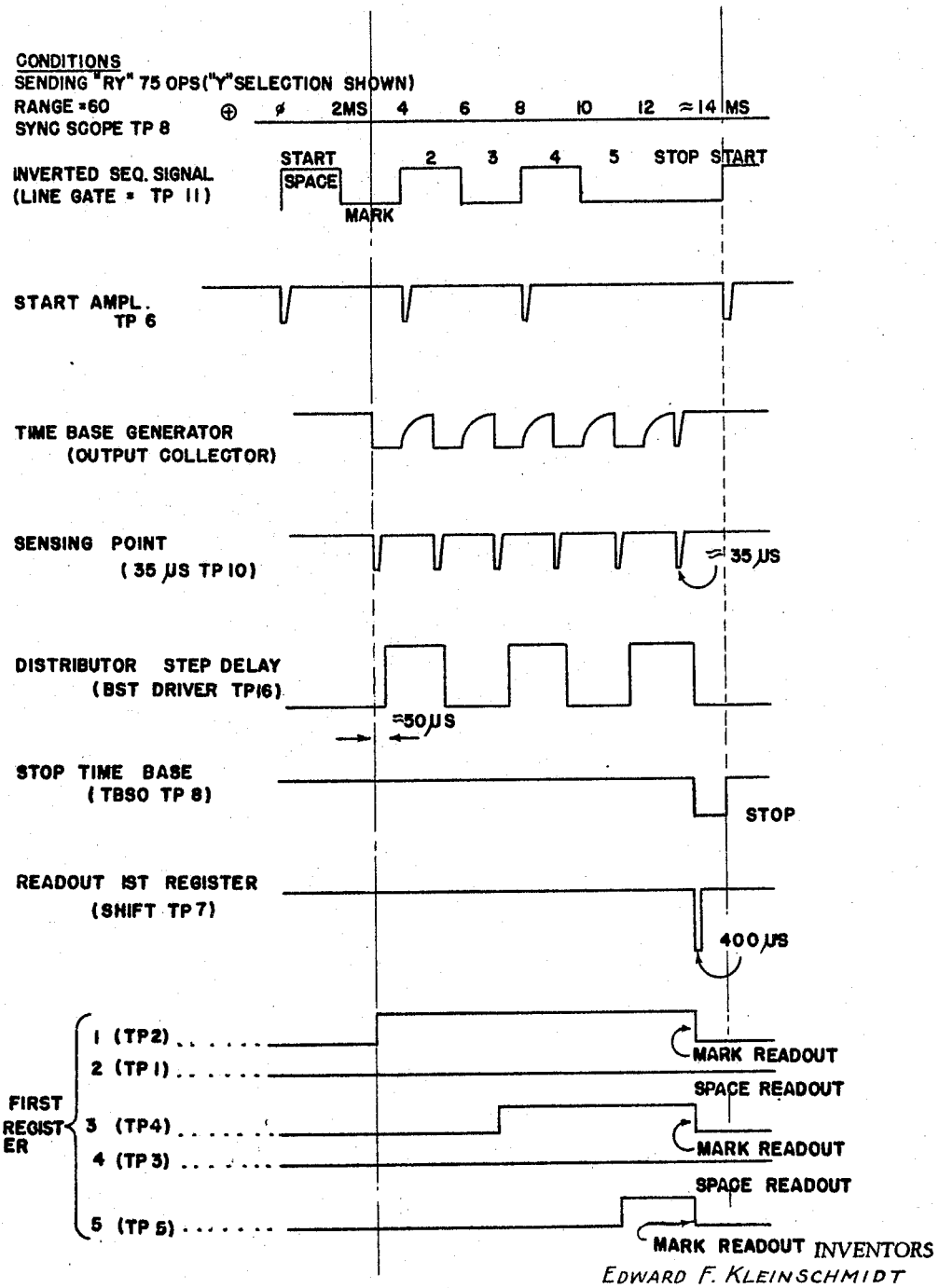

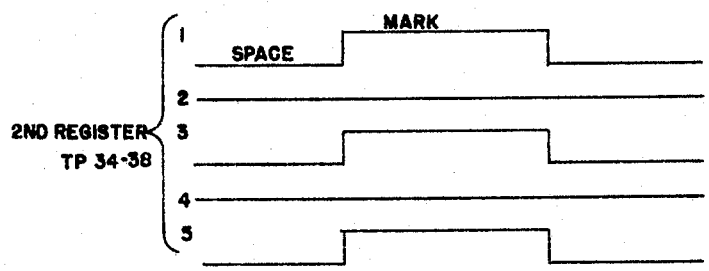
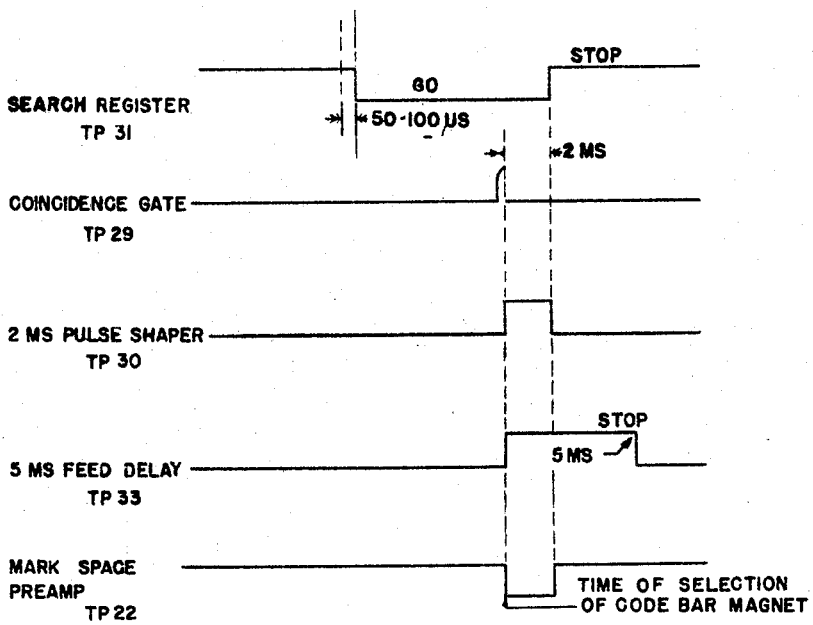
Fig. 13

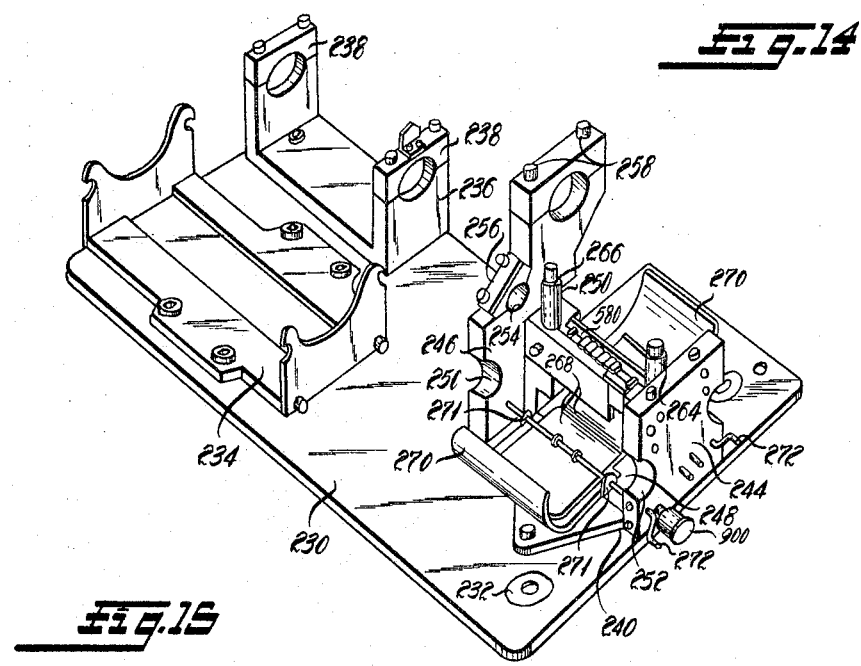

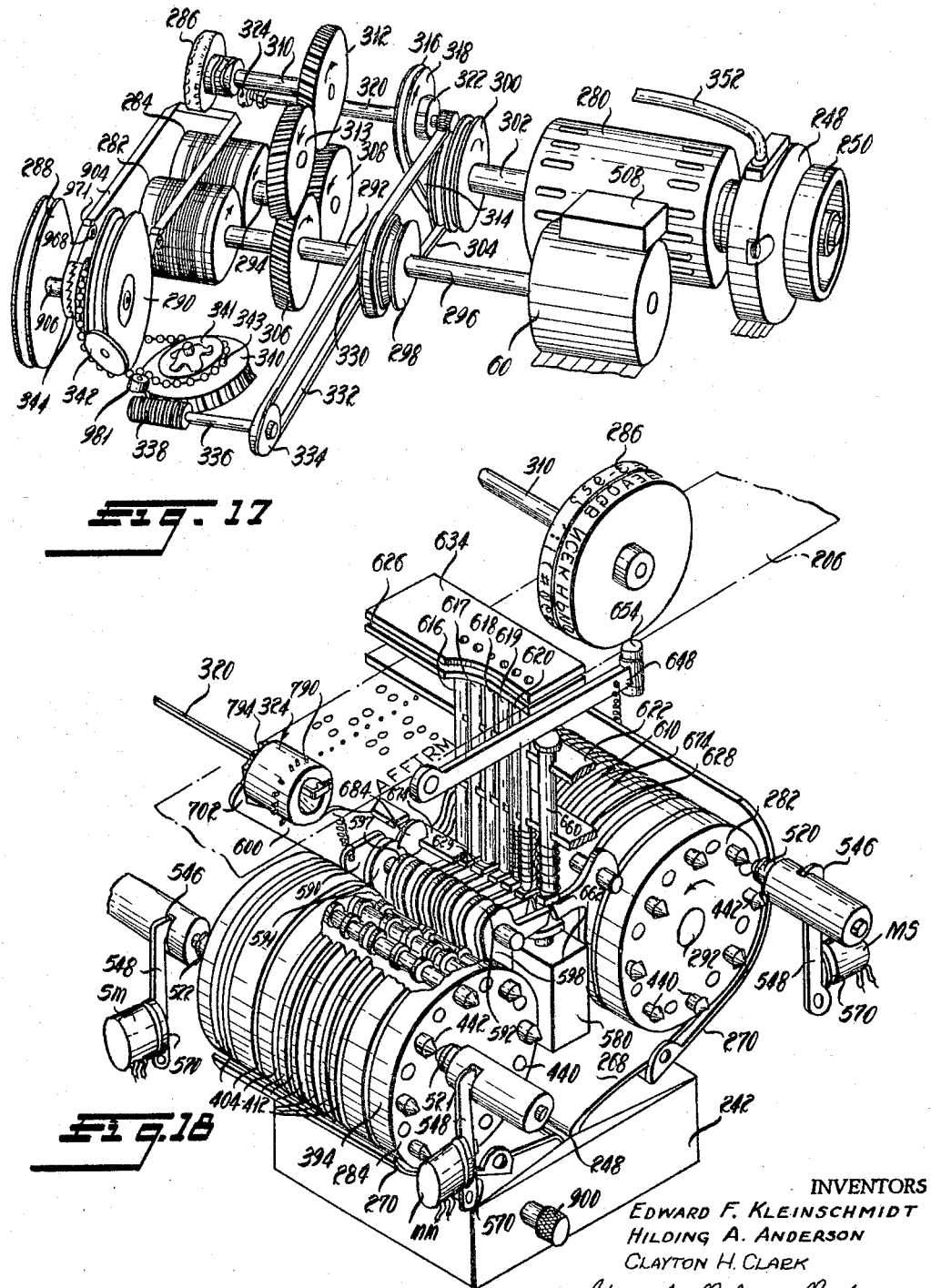

Aug. 2, 1966     E. F. KLEINSCHMIDT ET AL     3,264,409
COINCIDENCE DETECTION APPARATUS
Original Filed July 24, 1959                        22 Sheets-Sheet 17
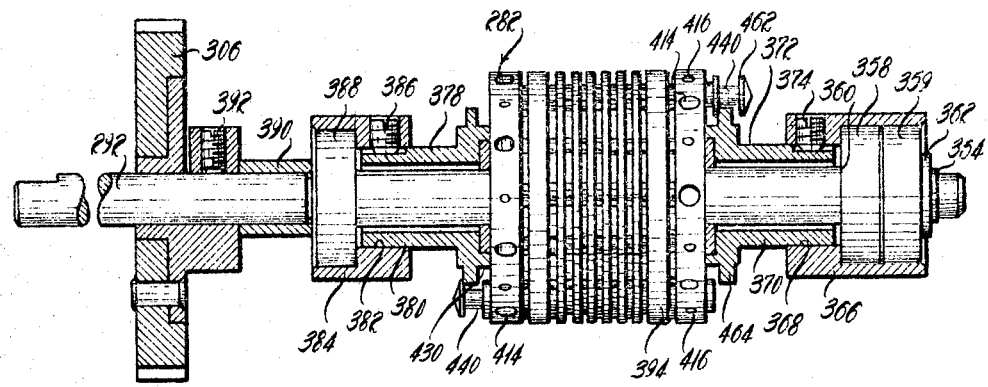
Fig. 19
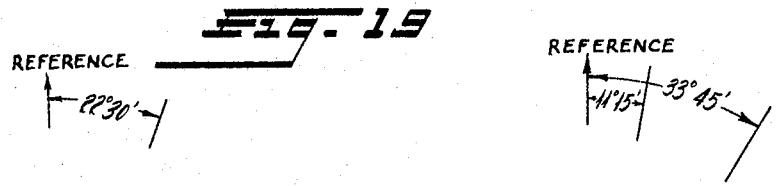
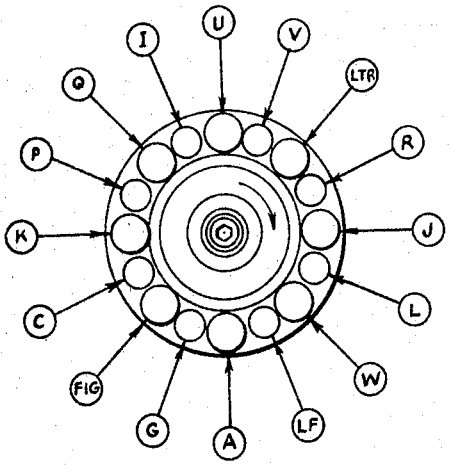
Fig. 20
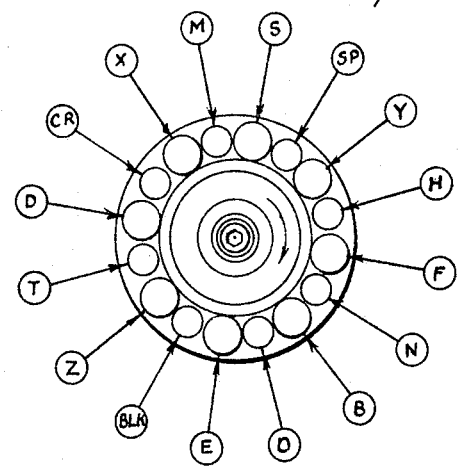
Fig. 21
INVENTORS
EDWARD F. KLEINSCHMIDT
HILDING A. ANDERSON
CLAYTON H. CLARK
BY *Strauch, Nolan & Neale*
ATTORNEYS INVENTORS
EDWARD F. KLEINSCHMIDT
HILDING A. ANDERSON
CLAYTON H. CLARK
BY Strauch, Nolan & Neale

ATTORNEYS

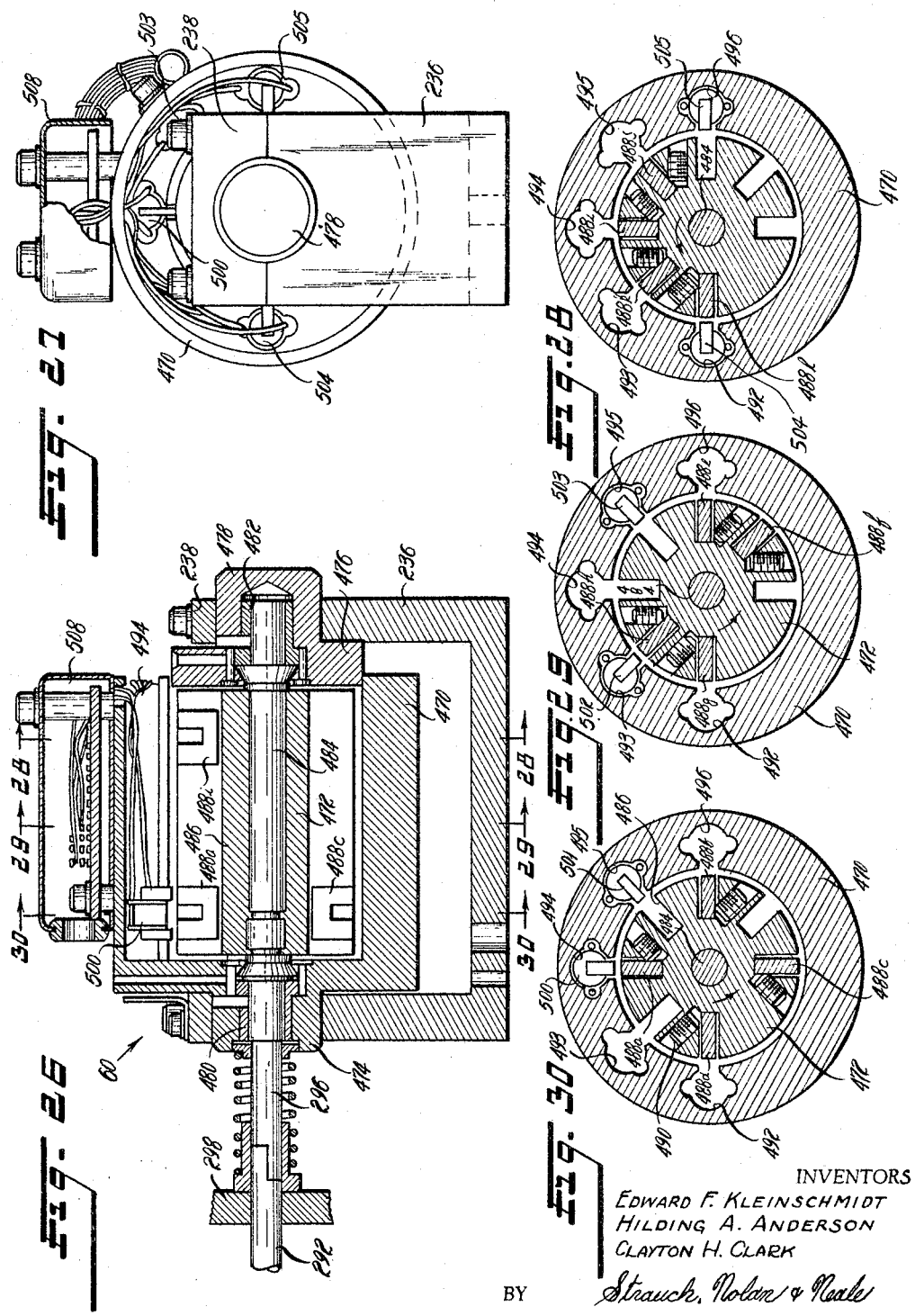

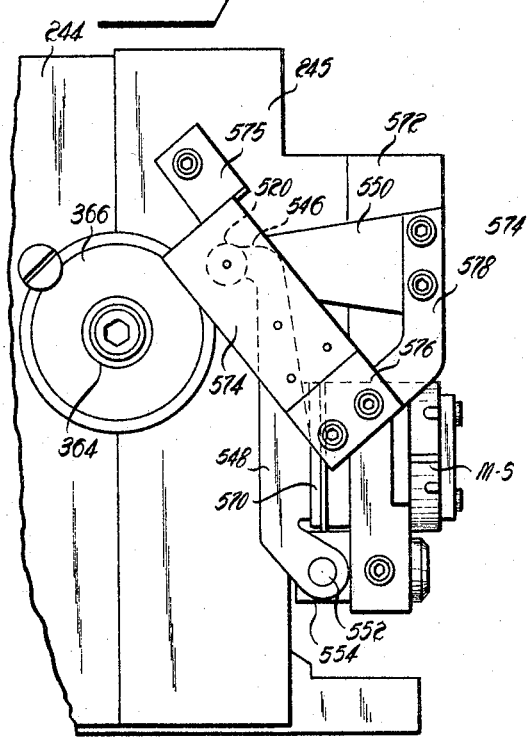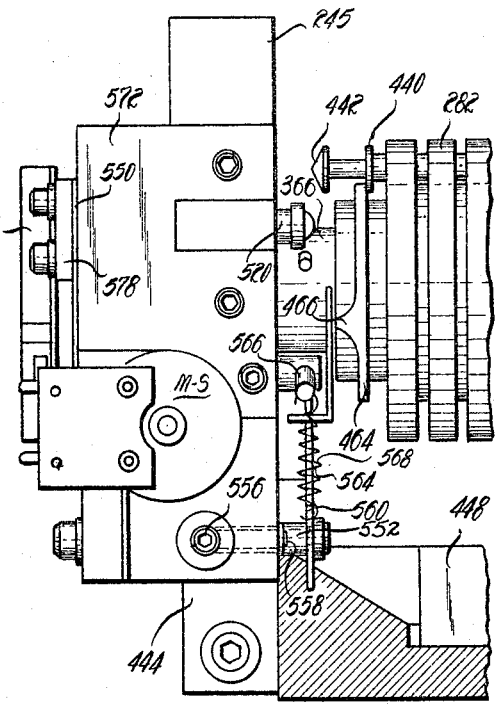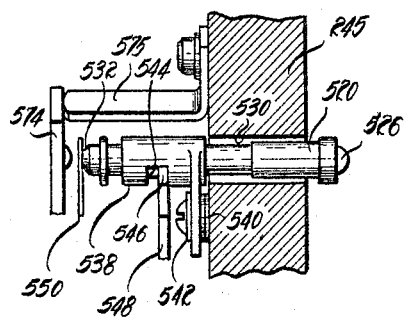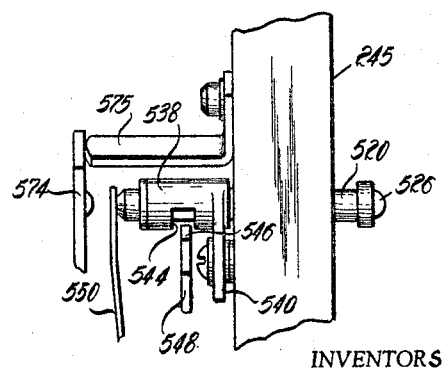
INVENTORS
EDWARD F. KLEINSCHMIDT
HILDING A. ANDERSON
CLAYTON H. CLARK
BY Strauch, Nolan & Neale
ATTORNEYS

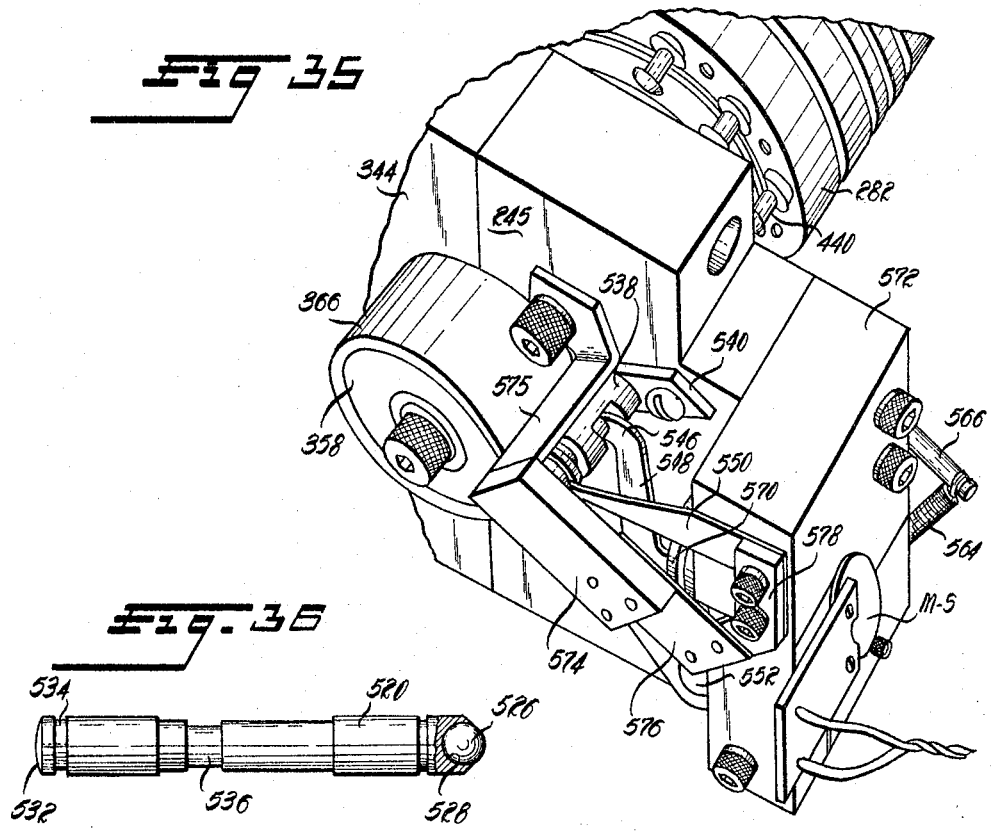

United States Patent Office 3,264,409
Patented August 2, 1966

3,264,409
COINCIDENCE DETECTION APPARATUS
Edward F. Kleinschmidt, Fort Lauderdale, Fla., and Hilding A. Anderson, Lake Zurich, and Clayton H. Clark, Mundelein, Ill., assignors to SCM Corporation, New York, N.Y., a corporation of New York
Original application July 24, 1959, Ser. No. 829,446, now Patent No. 3,150,235, dated Sept. 22, 1964. Divided and this application Nov. 22, 1963, Ser. No. 325,735
6 Claims. (Cl. 178—17)

This invention pertains to telegraph receiving apparatus and more particularly to a coincidence detection apparatus for use in a coded information receiving recorder combination capable of receiving code impulse combinations and recording visual representation of corresponding characters at any speeds up to at least 4500 operations per minute. In such high speed machines, recording and/or selecting may be accomplished "on-the-fly" and specific signals are matched with specific rotational phases of a machine component by some form of coincidence matching circuit. This is a division of copending United States application Serial No. 829,446, filed July 24, 1959, now U.S. Patent No. 3,150,235.

The electronic receiver selector storage and controller unit is capable of operational speeds many times higher than that of the mechanical printer and therefore is provided with built-in delay control. Means, described fully in the aforenoted parent application, are provided for storing backed-up signals which, at times, the printer will not be able to process because of an inherent range of operational functions between various ones of incoming signals to give a higher average number of operations per minute.

As will become clearly apparent in the detailed description of this invention, the mechanical operational time depends upon the sequence in which the characters corresponding to the Baudot code combination signals are being received. Some sequences of characters can be printed at maximum operational rates of 40 operations per second whereas others can be received and processed by the mechanical mechanism at operational speeds of up to 160 operations per second. Accordingly, the electronic receiver selector and controller is arranged to receive at 75 operations per second, an average speed which the mechanical printer-reperforator will normally be able to handle with a calculated back-up in the storage unit of no more than 20 characters. It is for this reason that a storage unit has been incorporated in the electronic mechanism. There are also means to bypass the storage unit if the incoming signals are being received at a rate no greater than 40 operations per second which the mechanical unit can accomplish with no back-up of signals even under the most adverse conditions of sequence of character reception.

According, the principal object of the present invention resides in the provision of a novel coincidence apparatus, for use in combination receiver printer-reperforator machine capable of extremely high speeds of operation, for coordinating operation between an electronic signal receiving-control device and the rotating components of a mechanical recorder.

Another object resides in the provision in a telegraph receiver-recorder apparatus having electronic receiving and control apparatus and mechanical high speed visual recording mechanism, of a novel combination electronic-electric-mechanical coincidence tie-in between the electronic control and mechanical recording mechanism.

A further object is to provide a novel means for indicating the instantaneous position of a rapidly rotating shaft and wheel through the use of prearranged groups of rotating permanent magnets and fixed pick-up heads in combination with an "and" gate.

Another object resides in the use of the indication from the preceding object to provide a driving signal to a plurality of electromagnets for providing a mechanical movement determined by the coincidence between the instantaneous position of said wheel and a variable input signal.

Further novel features and other objects of this invention will become apparent from the following detailed description, discussion and the appended claims taken in conjunction with the accompanying drawings showing a preferred structure and embodiment, in which:

FIGURE 1 illustrates a complete receiving printer-reperforator assembly incorporating this present invention. The cover of the assembly is illustrated in phantom lines to enable a general view of the relative disposition of the reperforator components, many details being omitted from this view for clarity;

FIGURE 2 is a schematic block diagram representing subcomponents of the unit shown in FIGURE 1 and also illustrating, in a general way, the manner in which the electronic and mechanical subcomponents cooperate;

FIGURE 3 is a chart of the five-unit Baudot telegraph code including the print symbols and functions assigned to each code combination;

FIGURE 4 is a breakdown of the standard Baudot code into four groups, each of which groups has the same first two code impulses for all of the code combinations in that group;

FIGURE 5 is a schematic illustration of the three planar magnet groups in the coincidence selector by which the cycle of rotation of the mechanical code rod wheel is divided into eight equiangular signal positions with eight different three-unit code signals generated for the respective eight positions;

FIGURE 6 is a chart derived from the four group breakown of the standard Baudot code of FIGURE 4 to further illustrate the manner in which a one-out-of-four selection of the first two units of the five-unit Baudot code can be matched with a one-out-of-eight selection of last three units of the five-unit Baudot code;

FIGURE 7 is a block diagram of the selector or sequential to parallel converter circuit which makes available, as an output signal, each of the five signal elements of the Baudot code for simultaneous processing throughout the remainder of the electronic circuitry;

FIGURE 8 is a block diagram of the controller unit for selectively energizing one of four code rods at a time interval which is synchronized with the rotation of the code wheel shaft;

FIGURE 9 is a block diagram of certain of the auxiliary equipment included in the controller unit for controlling the operation of the perforator and printer equipment;

Figure 10A:
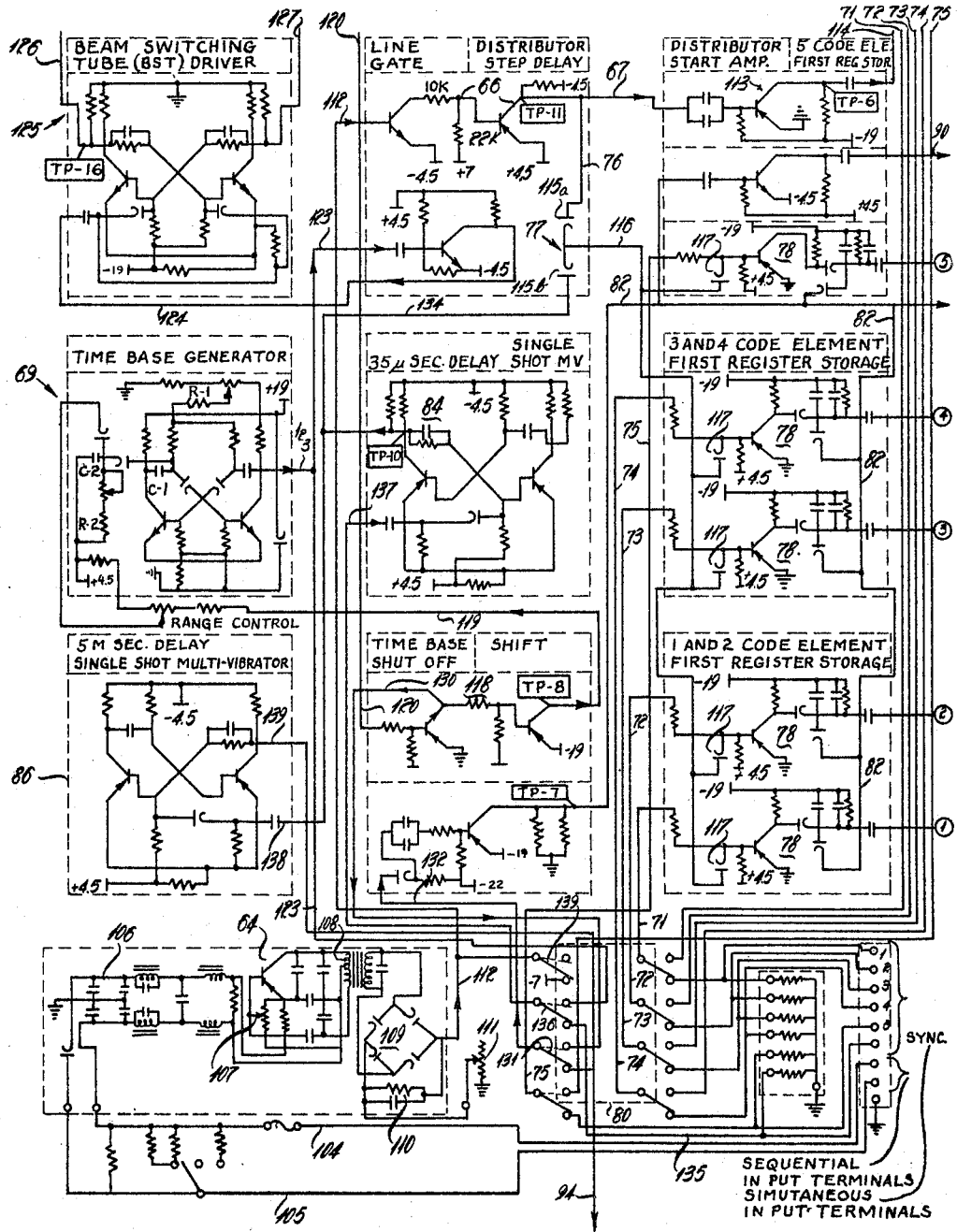
Figure 12:
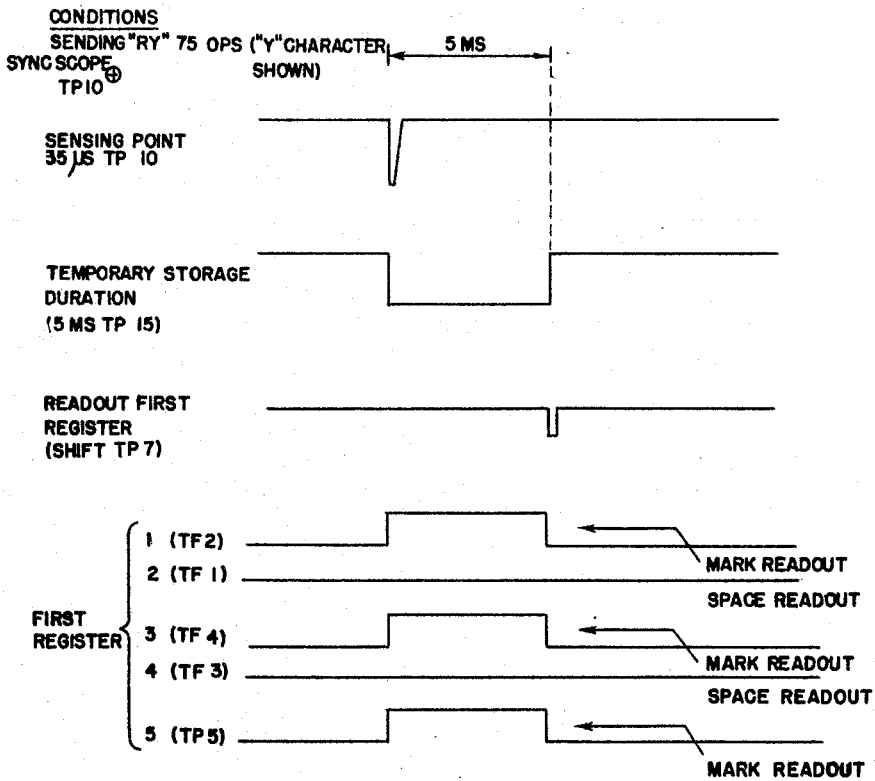
Figure 22:
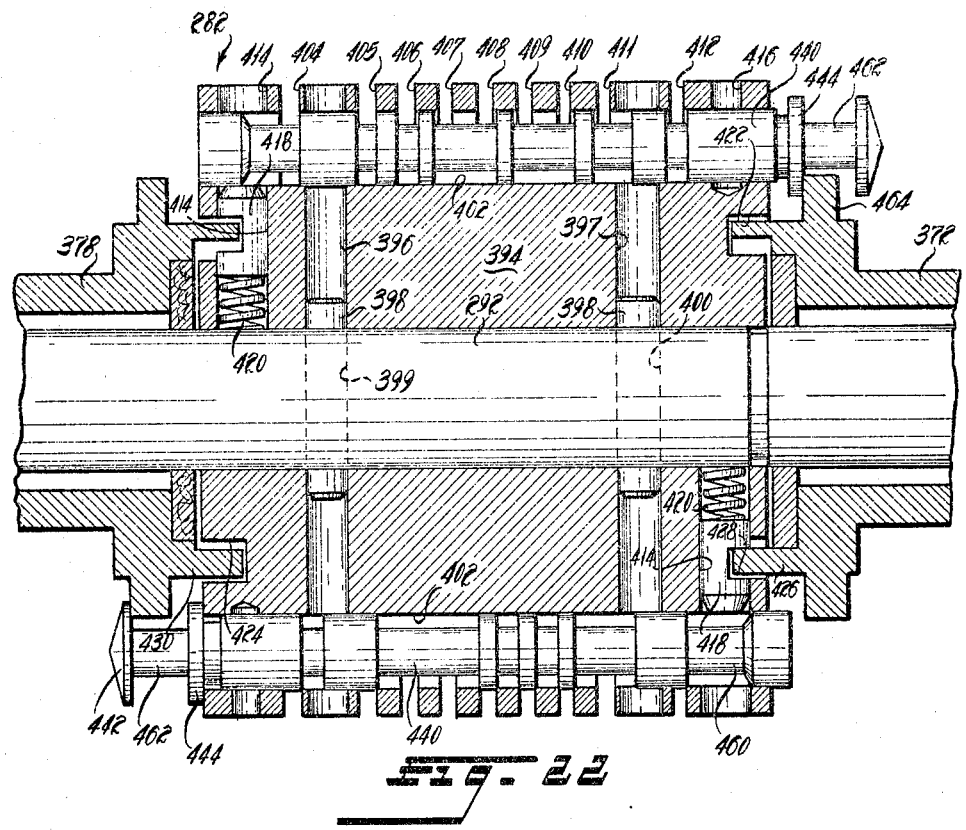
Figure 23:
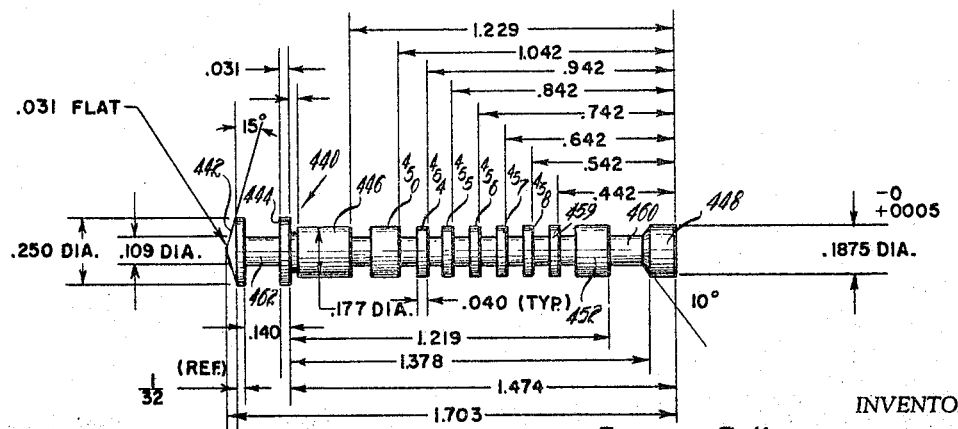
Figures 24, 25:
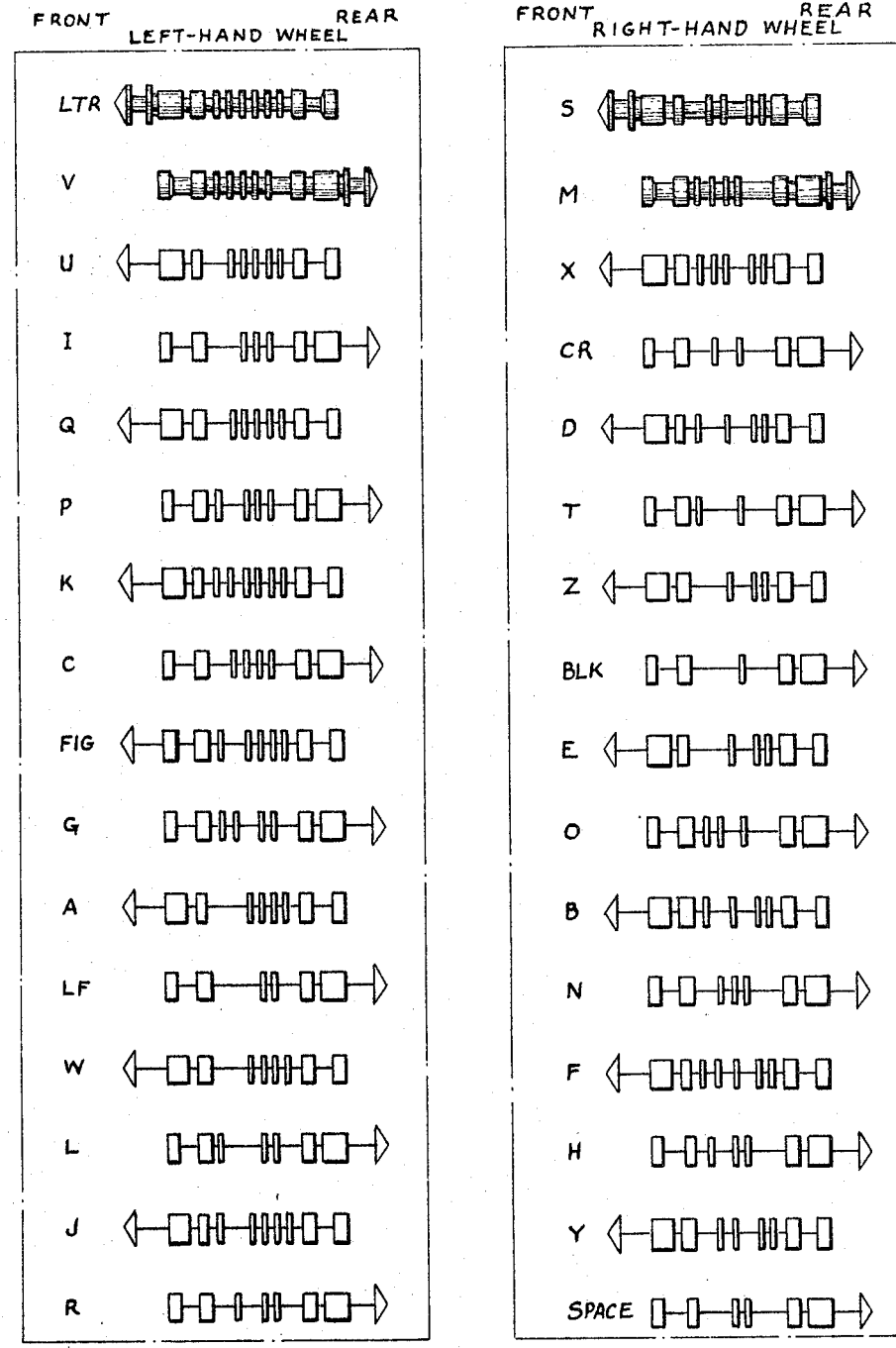

FIGURES 10A, 10B, 10C, 10D, 10E and 10F together comprise a detailed circuit diagram of a transistorized circuit corresponding to the block diagrams of FIGURES 7, 8 and 9;

FIGURE 11 is a timing chart for the various circuit stages in the converter unit of FIGURES 10A and 10B when set to receive sequential input signals;

FIGURE 12 is a timing chart for a converter unit of FIGURE 10A when set to receive simultaneous input signals;

FIGURE 13 is a timing chart illustrating various of the voltage signals present in the various circuit stages of the controller unit shown in FIGURES 10C, 10D, 10E and 10F;

FIGURE 14 is a perspective view of the base structure of the printer-reperforator;

FIGURE 15 is a mechanical timing chart on code rod selection and resulting reperforator operation;

FIGURE 16 is a mechanical timing chart showing actuations of reperforator printing, punching and tape feeding components during a 360° cycle of rotation of the code wheels;

FIGURE 17 is a schematic skeleton perspective view of the drive train in the mechanical printer-reperforator as viewed from an upper rear quarter;

FIGURE 18 is a perspective partially sectioned view of the punching, printing and tape feeding components shown somewhat schematically for clarity;

FIGURE 19 is a partially sectioned side elevation view of the right-hand code rod wheel assembly (the left-hand assembly being substantially identical in exterior appearance except for the length of the shaft);

FIGURES 20 and 21 are identical front end views of the code rod wheel assembly of FIGURE 19, FIGURE 20 representing the left-hand code wheel and FIGURE 21 representing the right-hand code wheel and each code wheel having legends appended thereto designating the code designation and angular disposition of each code rod;

FIGURE 22 is an enlarged section view taken on line 22—22 of FIGURE 21, illustrating internal details of the code rod wheel;

FIGURE 23 is an enlarged engineering drawing of a code rod with a complete set of interference flanges for the five (5) mark code (LETTERS), dimensions being appended to the rod inasmuch as size and mass of code rods are important considerations;

FIGURE 24 is a group illustration of the sixteen different code rods used in the left-hand code wheel disposed in a desired sequential order of disposition clockwise of the code wheel as viewed in FIGURE 20, several of the rods being shown in their true shape and the remainder being represented schematically;

FIGURE 25 is a group illustration similar to FIGURE 24 but showing the remaining sixteen code rods carried in the right-hand code wheel;

FIGURE 26 is a sectioned side view of the coincidence selector which is located behind and rotatable with the right-hand code wheel;

FIGURE 27 is a rear end elevation view of the coincidence selector shown in FIGURE 26;

FIGURES 28, 29 and 30 are section views taken respectively on lines 28—28, 29—29 and 30—30 of FIGURE 26, through the three magnetic planes of the coincidence selector and correspond to the three coincidence disc schematics A, B and C shown in FIGURE 5;

FIGURE 31 is a detail front view of the right-hand front code rod selector assembly;

FIGURE 32 is a detail side elevation of the right-hand front code rod selector assembly shown in FIGURE 31;

FIGURE 33 is a detail, partial top view of the selector assembly of FIGURE 31 showing the code rod selector plunger retained in a non-selecting position by the latch arm;

FIGURE 34 is a view similar to FIGURE 33 illustrating the plunger position after the latch arm is withdrawn and prior to engagement with and impact rebound from a selected code rod;

FIGURE 35 is a perspective view of the selector assembly of FIGURE 31;

FIGURE 36 is a partially broken away side view of a code rod selector plunger; and FIGURE 37 is a perspective view of the plunger latch arm assembly.

GENERAL DESCRIPTION

In the disclosed example of a high speed electronic mechanical printer-reperforator embodying the invention of this application, all components are housed in a single unit 50, as illustrated in FIGURE 1. The printer-reperforator unit 50, with reference to the schematic FIGURE 2, consists of several basic components some of which are electronic and others of which are electrical-mechanical. Actual printing and perforating operations are of a mechanical nature although powered by a continually operating electric motor. Mechanical code combination representations are contained on a plurality of code rods which, during the machine operation, are in continuous rotation as distinguished from the normal start-stop operations of known printing-reperforators used prior to this invention. The mechanical printing and punching components of reperforator unit 50 are coordinated with the electronic receiving and control components through an electronic coincidence circuit which actuates, in an electro-magnetical manner, selection of a code rod representative of a received electrical code signal combination.

In FIGURE 2, where the basic components of the control portion of reperforating unit 50 are illustrated schematically, it will be seen that the incoming electrical manifestation of code combinations (the example used being the standard Baudot code) may be received by a sequential to parallel convertor unit 52 through a two line sequential system or through a six signal line parallel system, five lines of which are for the different code manifestations and the sixth line for a control or sync signal. From convertor unit 52 the signals are electronically transferred to a controller unit 54 or to a storage unit 56, if the latter is being used. Use of storage unit 56 is optional and will depend on the line speed, i.e., the rate of incoming code combination signal impulses received by convertor unit 52. As an example, a line speed of 40 or fewer operations per second is sufficiently low to assure that the worst (maximum) time required for selection of two code representations received in sequence by the mechanical unit enables handling of the message without need for the storage unit. On the other hand, if the incoming rate is raised to 75 operations per second (o.p.s.), the contemplated design speed, the mechanical operating time requirements for certain character selection sequences in the mechanical operation exceeds the fixed 13.3 milliseconds between successive characters for a 75 o.p.s. rate. Utilization of the storage unit permits an intermittent back up in mechanical utilization of any signals from the controller, the sequence of which the mechanical part of the reperforator cannot process at the line frequency.

Electrical signals from controller unit 54 select a desired code rod, corresponding to the received code signal, in the printing-reperforating components 58. A tie-in control between the mechanical printer-reperforator component 58 and the controller 54 is provided through a rotary coincidence selector 60 operated in direct rotational relationship to rotation of the code rod wheels for the printer-reperforator component 58.

Operation of the complete machine 50 requires absolute correlation between the mechanical and electronic components. To obtain an ultra high speed (4500 o.p.m.) in the mechanical selection, printing, punching and tape feed, a plurality of small rigid code rod elements are mounted on a continuously rotating wheel. Operational kinematics utilizing transfer of energy by elastic impact enables attaining of rapid cyclic movements. These noted factors provide a very important advantage in that the code rod "wheel," if desired, can be, and in this invention has been, divided into two wheels, each wheel containing sixteen of the thirty-two code rod elements needed to represent individual code combinations of the Baudot code. Impact forces necessary to perform the printing, punching and tape feeding operations can all be derived from the kinetic energy of rotation of these operating wheels. Furthermore, because two wheels instead of one can be used, the diameter of the wheels has been reduced to the point where the velocity of the code rod elements mounted adjacent the rim of the wheels is sufficiently low so that the impact produced between a selected code rod and intermediate operating levers is not excessive. Finally, the electro-mechanical mechanism which selects and shifts a desired rod in an axial direction within either one of the operating wheels, can be controlled more easily by providing selecting devices on each side of each wheel. This mechanical selecting arrangement enables a division of the 32-unit Baudot code into 4 groups of 8 units each, thereby increasing the mechanical selection operating time by a factor of 4. Even so, if a larger code group such as a 64 character code is desired, then (1) four code wheels each carrying a 16 character group can be used or (2) means can be provided for shifting the type wheel which is provided with two rows of characters. This latter method is utilized and specifically described in the aforesaid parent application.

Having divided the Baudot code system into four groups of eight units, each group having the code rods corresponding to its included character unit equally circumferentially spaced around the peripheral rim of a code wheel, selection of a specific code rod element resolves into a combination of a one-out-of-four and a one-out-of-eight selection. The one-out-of-eight selection is directly related to eight angular positions of the eight code rods in each group about the 360° circumference of the associated code wheel. Although the four selection points for all four groups are mechanically offset as is apparent from FIGURE 2, they are coincided on a time basis by the displacement of the magnets and pick-up coils.

Coincidence of this angular phase relationship with specific code combinations is accomplished by an electronic-electrical-mechanical tie-in between the printer-reperforator and the electronic controller unit which compares and matches the last three units of a received five unit Baudot code combination with a corresponding three unit signal related to the code wheel eight position rotational phase. At every one of the eight phase positions of the code wheels, there are four code rod elements which could be selected. The electronic controller determines which one of the four code rods will be selected in accordance with a one-out-of-four signal represented by the first two impulses of a Baudot code.

FIGURE 3 is a chart illustrating all of the characters in the five unit Baudot code. In breaking this code into four groups (represented by FIGURE 4), it will be seen that in eight of the 32 code combinations, the same first two impulses occur. In other words, in one group the first two code impulses are mark-mark impulses; in a second group the first two code impulses are mark-space impulses; in the third group the first two impulses are space-mark impulses; and in the fourth group the first two code impulses are space-space impulses. The eight characters in each of these four groups have eight different 3-unit code impulses constituting the last three code impulses of the Baudot code. These same eight different 3-unit code combinations appear in the same sequence in the arrangement of each of the four groups, this similarity being depicted in FIGURE 4. Variations of the code may be used. However, if the sequence of characters is changed in one group, it must be changed in every group.

The chart in FIGURE 6 is developed from the four groups shown in FIGURE 4, the four vertical rows of characters representing the four groups of code combinations represented by mark-mark, mark-space, space-mark and space-space. These four groups are the ones which will be controlled by the one-out-of-four selector in the electronic controller (see FIGURE 2). In FIGURE 6 the eight horizontal lines contain four characters, each of which is represented by the same 3-unit code combination of the last three code elements in the Baudot code. The code rods for each four characters of these eight groups are located sequentially around the periphery of an associated code wheel at 45° increments. To accurately determine the eight positions of rotation of the code wheel or wheels, a rotating coincidence selector is rotated in direct relationship to rotation of the code wheels. The rotor of the coincidence selector includes permanent magnets operatively associated with fixed pick-up heads. As will be later described in detail, the output signal from the pick-up heads provides 3-unit code signals corresponding exactly to the last 3 code elements of the code combination in the Baudot code at each of the eight angular positions of the code wheels. Thus, insofar as the mechanical apparatus is concerned, we have a means for determining the exact point at which any one of the eight rotational angular positions passes a given point. If at that time we are able to select one of the four groups represented by the mark-mark impulses, mark-space impulses, space-mark impulses and space-space impulses, only one code combination character will be selected.

Returning now to FIGURE 1, the aforedescribed components of printer-reperforator 50 are arranged in small compact subassemblies integrated in a unit occupying approximately one and one-half cubic feet and having a total weight of approximately 50 pounds. The printer-reperforator component 58 occupies the center and forward portions of unit 50, coincidence selector 60 being a mechanical portion of this component. Located at the rear-upper portion of reperforator 50 is a box containing converter unit 52 and controller unit 54. The lower base portion 61 of reperforator 50 has space for the storage unit 56 and a front chad drawer 64.

Incoming five unit Baudot code signals are received by the converter unit 52 and are then transmitted through the storage unit to the controller 54. However, when the storage unit is not used, a dummy plug permits the code signals to be transmitted directly to the controller.

The electronic five unit code signal is split into two groups in the search register, the first being indicative of the first two units of the code which is then applied as one input signal to a first "and" gate which drives one of four magnets, designated SM (space-mark), MM (mark-mark), SS (space-space) and MS (mark-space) in FIGURE 2. The last three units of the five unit incoming signal and the electrical phase position relationship of the code element carrying wheels of the mechanical printing and perforating unit 58 are compared by means of a one-out-of-eight "and" gate. The output signal from the one-out-of-eight "and" gate is applied as another of the input signals to the first "and" gate to operate the one selected magnet, SM, MM, SS or MS at the proper time interval in the cycle of rotation of the wheel carrying the code rods. From the time of this code rod selection, actual printing and perforating operations, which are essentially mechanical functions and will be described hereinafter, occur while the output of the electronic system is blocked for the next 5 milliseconds.

ELECTRONIC SELECTOR AND CONTROLLER DESCRIPTION

Block diagrams

Turning now to FIGURES 7, 8 and 9, a functional block diagram of the electronic portion of the reperforator of the present invention is shown with the storage unit 56 as indicated in FIGURE 2 removed. In FIGURE 7, the sequential signal input line is connected to supply input signals to line oscillator 64, the function of which is to operate line gate 66 which provides a reproduced input signal having a sufficiently good wave shape to improve the reliability of operation of the electronic system. Also, as will be pointed out in the discussion in connection with FIGURE 10B, the line oscillator 64 and line gate 66 provide complete isolation of the electronic circuitry in the reperforator apparatus from the incoming lines.

An output signal from the line gate is applied on lead 67 to distributor 68 at the beginning of the reception of each five code element signal. The distributor 68 is advanced at a frequency determined by the frequency of operation of time base generator 69, the output of which on lead 70 controls the advancement of the distributor to provide selective output signals on leads 71, 72, 73, 74 and 75 at time intervals corresponding to the time intervals of reception of the sequential five element code through line gate 66. The five electrical signal impulses of the code are also applied sequentially on lead 76 to one input of "and" gate 77. The other input signal to "and" gate is on lead 134 from a 35μ second delay multivibrator 84 which is triggered by an output signal from time base generator 69. With the improved wave form provided at the output of line gate 66 and the precise timing of the control signal delayed by 35μ seconds from circuit 84, the output signal from "and" gate 77 is such as to assure reliable operation throughout the remaining circuitry.

The output signal from "and" gate 77 is applied as an input signal to each of the "and" gates designated 1, 2, 3, 4 and 5 respectively on lead 116. When the No. 1 code impulse appears on lead 76, only the No. 1 "and" gate is open while the Nos. 2, 3, 4 and 5 "and" gates remain closed. An electrical signal corresponding to whether the first code element is a mark or a space is thus transmitted to the No. 1 first register storage stage 78.

At the time the No. 2 code element appears on lead 116, the time base generator 69 has advanced distributor 68 to the point where the output signal from the distributor is on lead 72 which opens the No. 2 "and" gate to thereby permit the No. 2 first register storage stage 78 to receive a voltage corresponding to a mark or space signal in the No. 2 code element position. At this point in time, the "and" gates for the Nos. 1, 3, 4 and 5 code element signals remain closed.

Distributor 68 continues to advance in a cyclical manner providing a pulse shaped output signal on leads 73, 74 and 75 successively at time intervals corresponding to the appearance on leads 76 and 116 of the signals corresponding to the Nos. 3, 4 and 5 code elements. At the end of a cycle of operation, the first register storage stages 78 make available all five of the code signal elements of a single character of the Baudot code for simultaneous processing throughout the remainder of the electronic circuitry.

The time base oscillator 69 is a fixed frequency oscillator with separate plug-in RC combinations available to match the output frequency with the signal frequency used on the sequential line input to line oscillator 64. This enables the speed of the present invention to be matched with the message signal speed over the teleprinter line. After distributor 68 has completed one cycle, it initiates a stop bias signal to time base oscillator 69 whereby both remain in a rest condition until a new start signal is received over lead 67 from line gate 66.

The contents of the first storage register is read out in parallel. A read-out signal is provided on lead 82 from the first register read-out stage. This signal is generated during the sequential mode of operation at the time the stop bias signal is provided from the distributor to the time base oscillator 69 after the fifth signal code in it has been received. The actual read-out pulse is delayed slightly to assure that the No. 5 first register storage circuit has reached a stable status.

A sequential-simultaneous mode selector switch 80 is provided having a plurality of contacts which are mechanically interconnected. In FIGURE 7, these contacts are in a position adapted for receiving the sequential signal. The contacts of switch 80 when transferred to their alternate position adapt the present invention to receive the five code elements of the Baudot code simultaneously from five different signal channels along with a control or sync signal on the sixth signal channel as shown in FIGURE 7. When the simultaneous mode of operation is used, distributor 68, time base oscillator 69 and several of the associated circuits are not used. The input signal to "and" gate 77 from line gate 66 is continuously an open signal and the control sync triggers the 35μ second delay circuit 84 to thus open "and" gate 77 almost immediately upon receipt of the incoming signal. The input signals on each of the lines marked 1 to 5 are then transmitted directly into the corresponding first register storage stages 78.

For the simultaneous mode of operation, the control or sync signal accompanying the Baudot code signals is applied through line sensing one shot multivibrator 84 which provides a 35μ second delay and through five millisecond delay one shot multivibrator 86 to the first register read-out stage. After the read-out signal on lead 82 is applied to each of the first register storage stages 78, these stages are in condition to receive the next incoming signal code elements. The signal transmission in the simultaneous mode may be at any speed up to the maximum design speed of the equipment and no adjustments or changes are required for varying signal transmission rates.

FIGURE 8 is a functional block diagram of the controller unit which contains five second register stages 88 that receive as input signals the output signals of the first register storage stages 78 from FIGURE 7. The controller unit of FIGURE 8 requires varying time increments for operation depending upon the particular sequence in which successive characters are received in the message. As will be explained below the controller unit is cleaned out to be ready for the next signal when it arrives.

After the code element signals are stored in the second register stages 88, a slightly delayed read-out sync signal is applied to the search register stage in the controller unit as shown in FIGURE 8 from lead 90 which is derived from the first register read-out stage of the receiver-selector unit shown in FIGURE 7. The output signal from the search register on lead 91 is applied to open the shaft position coincidence detector (one-out-of-eight) to condition this circuit so that upon the proper coincidence of signals from the Nos. 3, 4 and 5 second register stages 88 and the output from the pick-up coils from sections "A," "B" and "C," an output signal will appear on lead 92. Instantaneously upon receipt of the incoming signal to the second register storage stages 88, the outputs from the No. 1 and the No. 2 second register stages are applied to the one-out-of-four "and" gate to condition one of the selector magnets MM, MS, SM or SS to be selected at the moment when time coincidence is registered by the shaft coincidence detector.

The output signal from the 2-millisecond gate pulse generator is applied directly as the last input to the one-out-of-four "and" gate to thereby trigger the correct selector magnet. At the same time, this signal discards the code then stored in the second register storage stages 88 by triggering these stages back to a no signal condition to place the second storage register in a condition to receive the next coded signal.

The output signal from the 2-millisecond gate generator is further applied by lead 93 to a five millisecond feed delay stop gate which is a single shot multivibrator. The output signal from this circuit prevents the shaft position coincidence detector from registering a coincidence output signal during the 5 millisecond gating time interval to enable the mechanical apparatus to perform the functions of perforating and printing the previously transmitted signal on the tape. During this interval, the next coded signal is received by the second register storage stages 88 so that the controller unit is ready to supply the next signal to the mechanical unit as soon as the preceding character has been processed.

At the end of the 5-millisecond delay, the shaft position coincidence detector will be unblocked and the mechanical apparatus will be ready to process the next character. However, if the next coded signal is not yet present in the second storage register stages, the search register will provide on lead 91 an inhibit signal that prevents an output signal from appearing on lead 92 from the shaft position coincidence detector circuit.

One of the novel features of the present equipment is the provision for manual tape feed-out, and an override feature which prevents further tape feed-out in event an incoming signal should appear. Manual depression of the tape feed-out push button 222 results in a transfer of the condition of the blank feed-out register circuit, which may be a bi-stable Eccles-Jordan type circuit, to provide an enabling signal to the shaft coincidence detector whereby a coincidence is indicated at a position corresponding to a code having 5 spaces to thereby advance the tape once each rotation of the code wheel shaft 292. Each time an input signal is received, the 35µ second delay circuit 84 (see FIGURE 7) produces an output pulse on lead 94. This signal will appear on lead 94 (see FIGURE 8) as the input to the blank feed-out register stage to override the effect of the manual tape feed button 222 and stop the tape feed-out operation so that none of the incoming signals will be lost.

FIGURE 9 shows the circuit diagram for controlling operation of various other auxiliary functions in connection with the operation of the reperforator unit. The type wheel of the printer unit contains two rows of thirty-two characters each, one row being designated letters and the other row being designated figures. The type wheel is shifted axially via electro-magnets when current passes through one or the other of the electro-magnet coils and remains in the selected position until again shifted.

As is apparent from FIGURE 3, the code for both LTRS and FIG starts and ends with two marks, the sole difference being in the No. 3 code element. Code elements 3, 4 and 5 are used as inputs to multiple "and" gates stage 96 shown in FIGURE 9 to selectively energize either the FIGS SHIFT CURRENT AMPLIFIER 97 or the LTRS SHIFT CURRENT AMPLIFIER 98 to momentarily energize the corresponding FIGS or LTRS SHIFT magnets and shift the printing wheel accordingly.

*Detailed circuit diagrams*

A circuit diagram of a transistorized circuit of the receiver-selector, which largely is a sequential-to-parallel signal converter (see FIGURE 7) and of the controller (see FIGURES 8 and 9) is shown in FIGURES 10A, B, C, D, E and F. Where possible, reference numerals and block diagram labels used in FIGURES 7, 8 and 9 are used to identify corresponding parts in the detailed circuit diagram of FIGURE 10. While the drawings show the complete circuit of the reperforator, the following description will be directed to the principal parts only since the functions of the circuit components not mentioned will be obvious to those skilled in this art.

FIGURE 10A contains nine circuit stages surrounded by dotted lines plus at the bottom of the sheet the input terminals, sequential-simultaneous mode selector switch 80 and the line oscillator. Each of the circuit component designations that are inside a dotted line block represents the circuit components that are mounted on a card. In those instances where more than one circuit function is supplied by the components on a single card, the title block is divided with left-hand title designating the function of the components in the upper portion of the dotted line block. Similar designations are used in the circuit diagrams of FIGURES 10B through 10F.

Referring first to FIGURE 10A, the sequential-simultaneous mode selection switch 80 is, in this FIGURE, shown in the simultaneous signal reception position. The following description will assume switch 80 to be in its alternate position and the sequential input signals to be applied over leads 104 and 105 through R-F filter 106 to line oscillator 64 which comprises a transistor connected as a Hartley oscillator operating at a frequency of approximately 200 kc. This oscillator circuit is unique in the sense that it is powered wholly by the energy of the input signal. No power supply or D.C. connection is provided between transistor 64 and the remaining components in the perforator unit of the present invention. When a mark pulse appears, the energy in the pulse is sufficient to cause the circuit to begin oscillating immediately and when the pulse terminates, the oscillations terminate, the threshold voltage level being adjustable by potentiometer arm 107. Transformer 108 has its primary in the oscillator circuit and there is no D.C. connection between the primary and the remaining circuit. This provides a completely isolated secondary circuit in which coded signals of uniform amplitude are provided for further use in the reperforator unit.

R-F filter 106 is important in this equipment to prevent the 200 kc. signal of oscillator 64 from appearing on the input signal line. Suitable impedances across leads 104 and 105 are provided to match the various different line currents that are likely to be encountered.

The secondary of transformer 108 contains a full wave rectifier bridge 109, the output of which is connected across RC network 110 and variable resistor 111 to ground. Variable resistor 111 serves as a bias control for the newly generated sequential Baudot code signals which appear on lead 112 to be supplied to line gate 66 at the upper center of FIGURE 10A.

The output signal from line gate 66 is connected via lead 67 to the start amplifier 113 for the distributor shown in FIGURE 10B. In effect, start amplifier 113 produces an output pulse on lead 114 every time there is a mark to space transition, which occurs between the end of the stop pulse and the beginning of the start pulse. If the distributor is already in the midst of a cycle of operation, then the output pulse on lead 114 is discarded. If the distributor is at rest, then an output pulse on lead 114 starts the distributor through a cycle of operation.

A second output signal from line gate 66 appears on lead 76 which is connected through "and" gate 77 composed of diodes 115a and 115b. The output from "and" gate 77 appears on lead 116 to five diodes 117 which are part of the "and" gates associated with each of the first register storage stages 78, as is shown in FIGURE 7. Through this circuit, each mark pulse is applied by lead 116 to each first register storage stage 78, but is accepted by only the one stage which is opened by the output signal from the distributor which is shown in detail in FIGURE 10B.

The output signals from the distributor appear on leads 71, 72, 73, 74 and 75 respectively for the number 1, 2, 3, 4 and 5 code elements. The output signals from the first register storage stages 78 appear on leads marked in FIGURE 10A along the right margin ①, ②, ③, ④ and ⑤.

Since the five code elements of a sequential code occur at successive time intervals which depend upon the line speed of transmission, a time base generator 69 is provided for driving the distributor of FIGURE 10B. Generator 69 is basically a free running multivibrator having removable plug boards containing different sized capacitors and resistors for C-1, C-2 and R-1, R-2 to provide the proper frequency for the various different operational rates varying from 368.1 to 4500 operations per minute, i.e. about 6 to 75 operations per second.

Time base oscillator 69 is keyed on and off with the reception and completion of each sequential code by time base shut off circuit 118 which normally supplies a biasing signal through lead 119 to prevent oscillation by time base generator 69. Time base shut off circuit 118 receives its input signal on lead 120 from the distributor in FIGURE 10B. When the distributor in FIGURE 10B starts through a cycle of operation, a signal appears on lead 120 which produces the signal on lead 119 that unblocks time base generator 69. This unblocking signal continues until the distributor returns to its rest position at which time the blocking signal again appears on lead 120.

Referring now to FIGURE 10B, the distributor illustrated is a conventional beam switching tube which is commercially available. Other types of distributor circuits, such as the ring circuits used in counters which use either vacuum tubes or thyratrons may be used. The beam switching tube shown in FIGURE 10B was chosen primarily because the tube and its associated control circuits were readily available through commercial sources.

The tube has target elements designated T–0, T–1, T–2 . . . T–9. The electrode T–1 is connected to lead 71, electrode T–2 is connected to lead 72, electrode T–3 is connected to lead 73, electrode T–4 is connected to lead 74 and electrode T–5 is connected to lead 75. The remaining target electrodes T–6 through T–9 are not used in this equipment and are connected so that the beam in the tube advances without delay to its rest position on target electrode T–0.

On the right-hand side of FIGURE 10B are a series of 10 K and 100 K load resistors which are connected to the several target electrodes are illustrated, and on the left-hand side of the figure are the screen grid resistors which are connected in a conventional manner. Since this type of tube and its control circuits are well known to those skilled in the art, the detailed functioning of the tube will not be described other than to describe that part of its operation which is unique with this equipment.

The input pulse from start amplifier 113 in FIGURE 10A is applied through lead 114 which extends on to FIGURE 10B, through capacitor 121 and lead 122 to the beam switching tube grid element G–0. This causes the electron beam in the tube to advance off target electrode T–0. With the electrode beam off electrode T–0, a voltage signal is produced on lead 120 which is supplied to time base shut-off stage 118 in FIGURE 10A to thereby provide the unblocking pulse on lead 119 to time base generator 69.

The output signal from time base generator 69 on lead 123 from time base generator 69 is applied upwardly along lead 123 to a distributor step delay stage. The output from the distributor step delay stage is on lead 124 and serves to trigger the beam switching tube (BST) driver stage, which is a bi-stable trigger circuit, into its alternate conductive stage with each successive pulse on lead 124.

The input signal to time base generator 69 on lead 119 is through a variable resistance designated range control. The purpose of the range control adjustable resistance is to provide an initial delay before time base generator 69 starts operation so that the first output signal on lead 123 that causes the beam switching tube to be advanced will be timed properly to advance the beam in the beam switching tube in FIGURE 10B to target electrode T–1 near the middle of the time occurrence of the first code element in the transmitted code. As is apparent from FIGURE 11, a delay of about 3 milliseconds is provided where the equipment is operating at the rate of signal transmission of 75 operations per second and the total time available to send the start space, the five mark-space permutations of the Baudot code and the stop signal is slightly less than 14 milliseconds.

In FIGURE 11, a timing diagram is shown wherein the character "Y" has been transmitted. Each of the five code elements thus is present for a time interval of approximately two milliseconds as indicated in the top line of the timing chart. The second line shows the code element reversed so that the space code elements are indicated as a positive going pulse whereas the mark elements are indicated as a negative going pulse. The inverted wave form illustrated is available in the line gate stage 66 shown in the upper center of FIGURE 10A at a test point (TP) 11.

The third wave form shown in FIGURE 11 is the output of the distributor start amplifier 113 in FIGURE 10A, the voltage wave form being that present at TP–6. As pointed out above, each time there is a transition from a mark to a space, there is an output signal from TP–6 (see start amplifier stage 113 on FIGURE 10A) on lead 114. However, the only signal which is used by the beam switching tube in FIGURE 10B is that signal which appears when the beam switching tube is in its rest position with the beam at target electrode T–0. Any other pulses applied to grid G–0 are ineffective.

The fourth chart in FIGURE 11 shows the output from time base generator 69. This output signal has a sharp negative going edge which is adjusted to be near the center of the time interval of each of the five code elements of the Baudot code. The first negative going pulse signal, however, is delayed by time base generator as explained above, before being applied to the beam switching tube driver through lead 124, by an amount to compensate for the width of the start space plus about the first half of the No. 1 code element in the Baudot code. The remaining output pulses from the time base generator 69 appear in a proper timed relationship to trigger beam switching driver circuit 125 at the proper time interval.

The output signal on lead 123 from time base generator 69 is applied as the input signal to 35μ second delay single shot multivibrator on lead 137 through contact 136 (in its transferred position for the sequential mode of operation) of switch 80. The voltage wave form as shown in the fifth timing chart in FIGURE 11 is provided at the output of the 35μ second delay multivibrator (TP–10). This signal is produced at the repetition rate of the output signal of time base generator 69 and applied through lead 134 to diode 115b of "and" gate 77.

With continued reference to FIGURE 10A, the output leads 126 and 127 from the beam switching tube driver 125 are shown in FIGURE 10B to be connected through capacitors 128 and 129, respectively, to the beam switching tube grid G-EVEN and G-ODD so that the alternating signals produced by the beam switching tube driver on leads 126 and 127 advance the beam inside the beam switching tube in a counterclockwise manner with the beam stopping at the target electrodes T–1, T–2 through T–5 for time intervals sufficient to apply the necessary pulse on leads 71, 72, 73, 74 and 75, respectively, which time interval is determined by the repetition rate of time base generator 69. As is apparent from FIGURE 10A, the signals on leads 71 through 75 pass through the transferred contacts of mode selector switch 80 to one input of the "and" gates 117 and the first storage register stages 78 in a sequential manner to cause a voltage condition to be stored in the first register storage stages 78 associated with the leads marked ①, ②, ③, ④ and ⑤ which corresponds respectively to the five signals comprising the incoming Baudot code signal.

When the beam in the beam switching tube advances to its rest position at target T–0, a blanking signal is provided on lead 120 to time base shut-off stage 118 to thereby block further output signals from time base generator 69. As shown in FIGURE 11, the output signal from time base shut-off stage 118 at TP–8 comprises a negative pulse which extends until the next start pulse is received on the next incoming code sequence.

A second output signal from time base shut-off stage 118 is provided on lead 130 which goes through the transfer switch contact 131 to lead 132. As shown in FIGURE 11, the output signal from TP–7 of the shift stage is a short negative going pulse which is applied to lead 82 (see FIGURE 10A) as a read-out pulse through the cathode of the diode in each of the five first register storage stages 78. This then makes available on the leads in FIGURE 10A at the right margin identified as ①, ②, ③, ④ and ⑤, a voltage impulse corresponding to the five code elements which have just been received.

*Simultaneous mode of operation*

For the following description, referring to FIGURE 10A, it will be assumed that a simultaneous input signal is received on the simultaneous input terminals marked 1, 2, 3, 4, 5 and sync. The contacts of switch 80 for this mode of operation are in the position illustrated in solid lines so that the mark signals which are transmitted as positive pulses will be supplied to "and" gates 117 of the first register storage stages 78 on leads 71, 72, 73, 74 and 75. The first register storage stages 78 are not opened, however, until a control pulse is present on lead 116 through "and" gates 117. The control signal on lead 116 comes from the 35 microsecond delay single shot multivibrator 84 through lead 134. The other input from line gate 66 to "and" gate 77 is held open by a continuous positive voltage on the anode of diode 115a resulting from contact 139 of switch 80 being connected to negative 7 volt bias on lead 112 to the line gate.

The incoming sync signal is applied through lead 135, switch contact 136 and lead 137 to the 35 microsecond delay single shot multivibrator stage 84. The negative going output signal at TP–10 from 35-microsecond delay single shot multivibrator 84, in addition to being applied though "and" gate 77 via line 134, is applied through lead 138 to the input of 5 millisecond delay stage 86.

The timing chart in FIGURE 12 shows the time relation of the output signal at TP–10 in the 35-microsecond delay single shot multivibrator stage 84 and the signal at the first register storage stages 78 which receive the coded signals at that time interval. At the end of 5 milliseconds, an output signal appears on lead 139, through switch contact 131 in its illustrated solid line position and lead 132 to the shift stage. The output signal at TP–7 of the shift stage on lead 82 is provided, as in the case of the sequential input signal, to effect a read-out of the signals stored in the first register storage stages 78 by making the voltage levels stored available on the terminals ① through ⑤ at the right-hand margin of FIGURE 10A.

Along with the output signals from the first register storage stages 78, the read-out signal on lead 82 is provided as a control pulse. When the storage unit is used, this pulse is used as a strobe pulse to effect the storage of signals on leads ① through ⑤ as will be described below in connection with the storage unit shown in FIGURES 15–19. When the storage unit is not used, the pulse on lead 82 is discarded, and instead, a slightly delayed pulse appearing on lead 90 is used in the control unit to be next described.

CONTROLLER UNIT

Figure 10C:
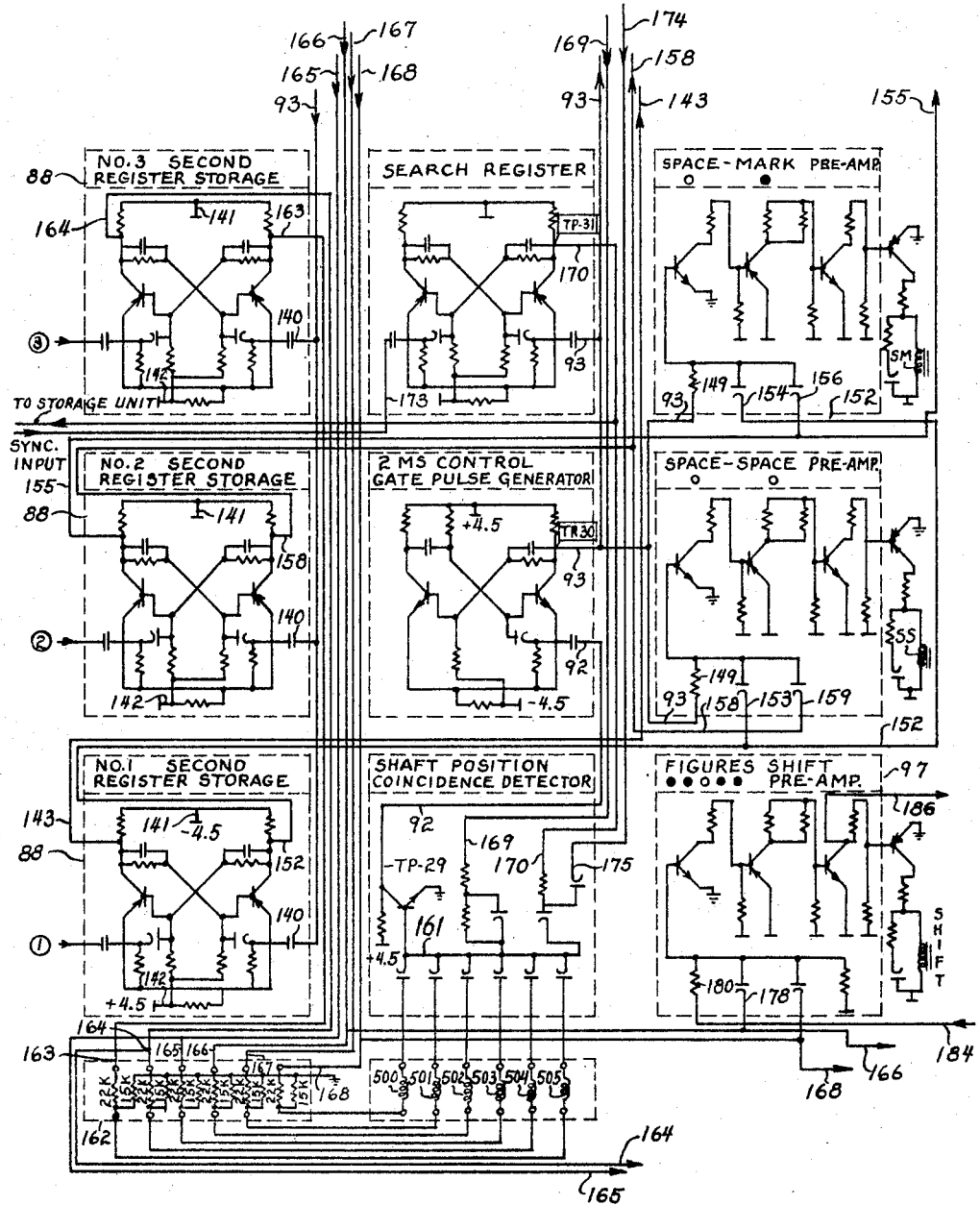
Figure 10E:
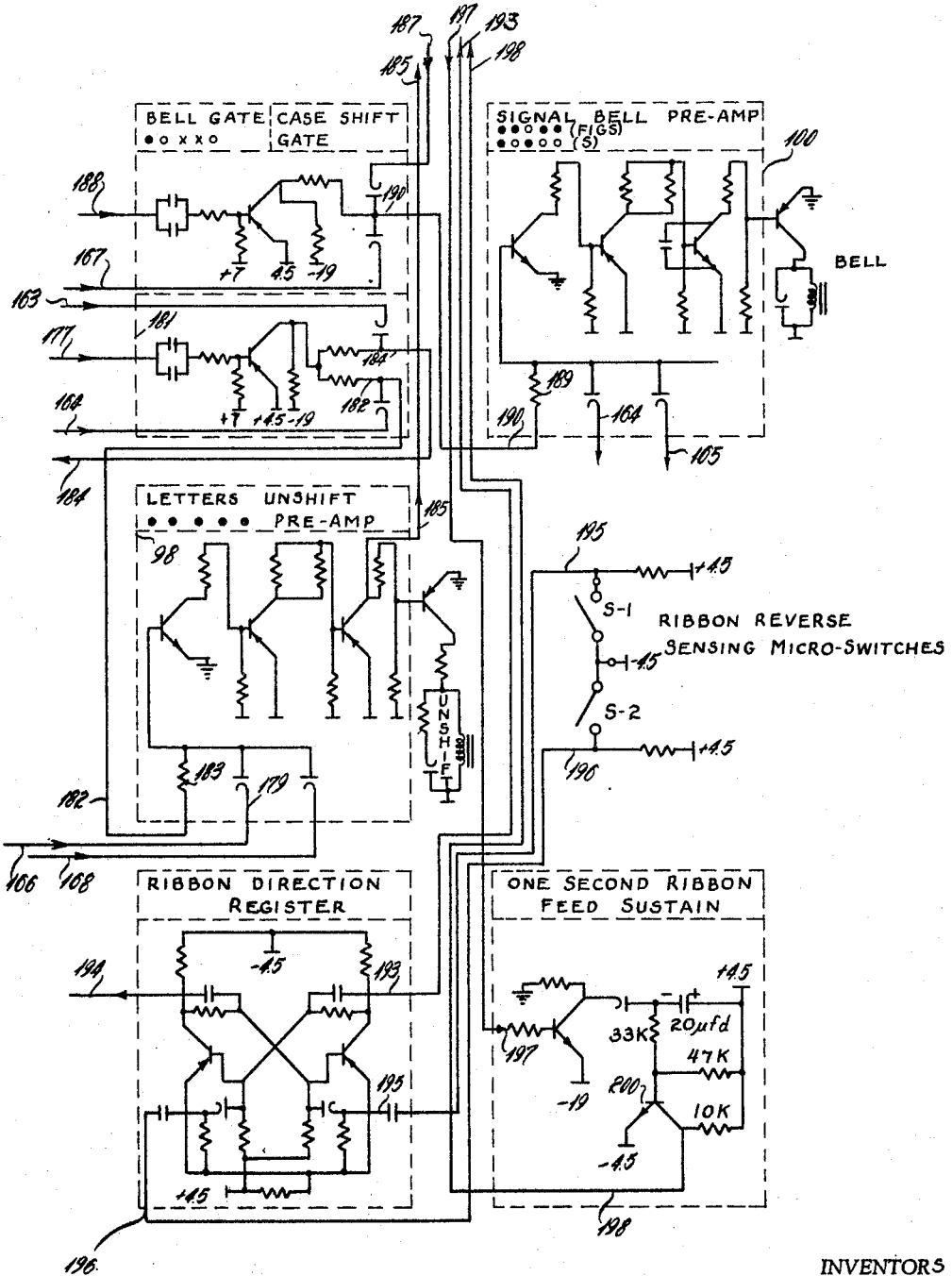

The controller unit circuit diagram is shown in FIGURES 10C, D, E and F. Referring first to that portion of the controller unit shown in FIGURES 10C and 10D, the five second register storage stages are shown along the left-hand margin of the two sheets containing those figures and the signal input terminal to each of the five stages is marked with the digit ① through ⑤ which corresponds to the code element which each stage receives. Each of the second register storage stages 88 comprises a bi-stable circuit of the Eccles-Jordan type so that once an input signal is received, the circuit maintains that status until a reset signal is applied on lead 93 through capacitors 140. In this particular circuit, a space is represented by no signal and a mark represented by a signal over input leads ① through ⑤.

Each of the second register storage stages 88 is supplied with a negative 4.5 volts on terminal 141 and a positive 4.5 volts at terminal 142. The reset pulse on lead 93 through capacitors 140 cause the right-hand side of the circuit to conduct while current conduction through the left-hand side is blocked. If any code element in the Baudot code is a mark, a signal is received on the corresponding input lead marked ① through ⑤ to transfer the circuit in the particular second register storage stage 88 to its alternate condition whereby the left-hand side becomes conducting and the right-hand side is cut off. A signal indicative of a space in the Baudot code comprises no signal whatsoever. Thus, if no signal is received, the second register storage stages 88 are in a space indicating condition which, as is apparent from FIGURES 4 and 6, is used to indicate a blank.

Referring now to FIGURE 10C, if the signal in the No. 1 second register storage stage 88 is a space, the left-hand side will be cut off thereby providing a negative voltage of about 3 volts on lead 143 to the cathode 144 of diode 145 of the mark-space pre-amp stage 146 as shown in the upper right-hand portion of FIGURE 10D, and to cathode 147 of the mark-mark pre-amp. Diode 145 together with diode 148 and resistor 149 across which a positive pulse is applied through lead 93 from the 2-millisecond control gate pulse generator shown in the middle of FIGURE 10C comprise an "and" gate for the mark-space pre-amp. Analogous "and" circuits are provided for each of the three addition selector magnet pre-amps, viz. mark-mark (FIGURE 10D), space-mark and space-space (FIGURE 10C).

A positive pulse is applied through resistor 149 in each of the "and" gates of the above-identified pre-amp stages. This causes the anodes of the two diodes, viz. for example, diodes 145 and 148 in the mark-space pre-amp 146, to go positive and thus apply a positive signal on lead 93 to the mark-space pre-amp, only if the cathodes of diodes 145 and 148 are both at a positive potential. If either cathode is at a negative potential, the anode of that diode and hence conductor 151 cannot rise to a higher positive potential and the pulse is accordingly blocked from being transmitted along lead 151 to the pre-amp.

If a mark pulse appears at input ① of the No. 1 second register storage stage 88, the circuit will transfer to its other stable condition whereby a positive voltage of about 3 volts is applied on lead 143 to the cathode 144 of diode 145 in the mark-space pre-amp circuit 146 and to cathode 147 of the mark-mark pre-amp circuit both in FIGURE 10D.

A second output signal is supplied from the No. 1 second storage register on lead 152 which is applied to cathode 153 of the first diode in the space-space pre-amp, FIGURE 10C, and also to cathode 154 of the first diode in the "and" gate for the space-mark pre-amp shown in the upper right-hand corner of FIGURE 10C. The signal on lead 152 is opposite in polarity to the signal on lead 143. Thus, when a space condition is indicated by the No. 1 second storage register, a positive voltage is applied on lead 152 to each of cathodes 153 and 154 of the space-space pre-amp and space-mark pre-amp respectively. If both of the other inputs are of proper polarity, an output signal from the pre-amp stage will be provided for a period of 2 milliseconds to energize the corresponding selector magnet coil.

The No. 2 second register storage stage operates in identically the same manner as does the No. 1 second register storage stage and is so wired with the selector magnet pre-amps that the positive voltage on lead 155 when a mark signal is present as the No. 2 code element is applied to cathode 156 of the second diode in the "and" gate of the space-mark pre-amp shown in the upper right-hand corner of FIGURE 10C and to the cathode 157 of the second diode in the "and" gate of the mark-mark pre-amp in the lower right-hand corner of FIGURE 10D.

When the No. 2 code signal of the incoming Baudot code is a space, the positive voltage on lead 158 of the No. 2 second register storage stage is applied to the cathode 159 of the second diode in the "and" gate for the space-space pre-amp shown on FIGURE 10C and through lead 158 to cathode 160 of diode 148 of the "and" gate for the mark-space pre-amp 146 shown in FIGURE 10D.

The four magnet coils designated M-S at the output of the mark-space pre-amp and M-M at the output of the mark-mark pre-amp of FIGURE 10D and S-M of the space-mark pre-amp and S-S of the space-space pre-amp of FIGURE 10C are momentarily supplied with a current from their corresponding pre-amp stages for a period of approximately 2 milliseconds to thus energize the one-out-of-four selector magnets which will be effective to cause the desired character to be printed and punched on the paper tape.

As is apparent from FIGURE 2, each of the four selector magnets has associated therewith eight code rod elements. These eight code rod elements are accessible from one end of a wheel which turns at a uniform angular velocity of approximately 3700 r.p.m. and a particular one of the code elements which is selected depends upon the precise moment of energization of whichever of the selector magnet coils S-M, M-M, M-S and S-S that is chosen.

Referring now to FIGURE 5, a series of pick-up coils 500, 501, 502, 503, 504 and 505 are illustrated in a physical position relative to the permanent magnets 488a through l mounted on wheels which turn synchronously with the code rod wheel shaft 292. The four permanent magnets 488 on each of the three sections of the wheel are so related relative to the two fixed pick-up heads that currents are generated through the coils which correspond to the No. 3, No. 4 and No. 5 code impulses of the Baudot code so as to provide a gating signal which will energize one of the code rod selection magnets S-M, M-M, M-S and S-S of FIGURE 2 at precisely the correct moment.

In the position illustrated in FIGURE 5, an output signal will appear in the mark coil 504 in the "A" plane since a permanent magnet 488 is immediately adjacent pick-up coil 504 but no signal will appear from the space pick-up coil 505; similarly, in the "B" plane, an output signal will appear from mark coil 502 but no signal will appear from space coil 503; and in the "C" plane, an output signal will appear from the mark coil 500 but none from the space coil 501. As the pick-up coils appear in the "A," "B" and "C" planes which correspond to the last three code impulses of Baudot code, it is possible at this point in time to select the code bar element corresponding to: "letters" if the first two Baudot code impulses are mark-mark; "X" if the first two code elements are mark-space; "V" if the first two code elements are space-mark; and "M" if the first two code elements are space-space.

As the code wheel shaft 292 rotates one-eighth of a revolution counterclockwise, an output signal will be obtained from the wheel in the "A" plane from mark coil 504 and none from the space coil 505. In the "B" plane, no signal will appear from the mark coil 502 at this position, but an output signal will appear from the space coil 503. In the "C" plane, no output signal will appear from the mark coil 500, but an output signal will appear from the space coil 501. Thus, at a position 45 degrees counterclockwise from that illustrated in FIGURE 5, an output signal will appear from the mark coil 504 and from the space coils 503 and 501 to indicate the No. 2 code position of the code wheel which makes available the code rods for the letters U, S, I and "space," depending upon whether the first two code elements are mark-mark, mark-space, space-mark or space-space respectively.

As is apparent from the chart in FIGURE 6, the mark coil 504 in the "A" plane will provide an output signal at each of the first four positions and then the space coil 505 in the same plane provides an output signal in the last four positions as the code wheel shaft makes one revolution. In the "B" plane, the mark coil 502 provides an output signal at the first, fourth, fifth and eighth positions whereas the space coil 503 provides an output signal at each of the second, third, sixth and seventh positions. In the "C" plane, the mark coil 500 provides output signals at the odd numbered positions whereas the space coil 501 provides output signals at the even numbered positions. Thus an output signal is provided from one or the other of the mark or space coils in each of the "A," "B" and "C" planes at each of the eight positions of the code rods around the code wheel shaft to thus provide three output signals indicative of the code wheel position at each of the 45° points on the code wheel.

The several pick-up coils 500–505 are shown at the bottom center in FIGURE 10C and numbered with the corresponding reference numerals. One terminal of each of the pick-up coils 500–505 is connected to a separate anode of a series of six diodes having their cathodes connected in parallel to thus form an "and" gate. In this gate circuit, the common cathode conductor 161 is held at a positive potential of approximately 0.2 volt so long as any one of the anodes of the diodes is connected through pick-up coils 500–505 to a positive voltage at the lower terminals of the resistor network 162. The upper terminal of each of the 15 K resistors is connected to ground. The upper terminal of each of the 22 K resistors is connected to one or the other of the output terminals from each of the No. 3, No. 4 and No. 5 second register storage stages 88. When the No. 3 code signal is a space, a positive voltage of approximately 3 volts appears on lead 163 while a negative potential of about the same magnitude appears on the adjacent lead 164. The corresponding output leads 165 and 166 from the No. 4 second register storage stage shown in FIGURE 10D are connected to the next pair of terminals of resistor bank 162. Output leads 167 and 168 are connected from the No. 5 second register storage stage 88 to the third pair of resistors in the resistor bank 162.

When the input signals to Nos. 3, 4 and 5 second storage stages are all marks, then the left-hand side of each of the second storage register stages 88 for the Nos. 3, 4 and 5 signals is conducting thereby providing a positive output signal of approximately 3 volts on leads 164, 166 and 168 respectively and negative voltage of approximately 3 volts on each of the leads 163, 165 and 167 respectively. The only time that a negative going output pulse can appear on the common cathode conductor 161 is when each of the anodes of the six diodes is made negative since so long as any anode is retained at the slightly positive potential, the voltage drop across that particular diode, being substantially zero in its forward direction, prevents the cathode from dropping to a negative value.

Three of the anodes are always connected to positive voltages in resistor bank 162 irrespective of whether the code signals are a mark or space, and it is necessary that the negative going voltage pulse supplied by each of pick-up coils 500–505 as the result of the rotation of a permanent magnet 488 as shown in FIGURE 5 past the pick-up coils to be present in the particular ones of the anode circuits which are connected to the positive voltage from the Nos. 3, 4 and 5 second register storage stages 88 before a coincidence can be indicated.

Under the assumed example where the positive voltages are supplied on leads 164, 166 and 168 corresponding to a mark signal in each of the No. 3, No. 4 and No. 5 second register storage stages, a coincidence will be indicated when a neutralizing voltage of negative polarity is provided by the corresponding pick-up coils 500, 502 and 504. This condition exists only at the position of the code rod selection shaft illustrated in FIGURE 5 where a permanent magnet 488 is in operative relation with each of the mark coils: 500 in the "C" plane, 502 in the "B" plane, and 504 in the "A" plane. At this point in time, a negative going coincidence indicating pulse is provided on conductor 161. A positive going pulse then appears on lead 92 as illustrated in the timing chart of FIGURE 13 and is applied to the input of the 2-millisecond control gate pulse generator. The output signal on lead 93 at test point (TP) 30 shown also in FIGURE 13 is applied to resistors 149 in the "and" gates for each of the mark-space, mark-mark, space-mark and space-space pre-amp stages to thus trigger the one of the four stages which has a positive voltage applied to the cathodes of each of the diodes in the associated "and" gate into a conductive condition to thereby energize the corresponding selection magnet.

The leading edge of the output signal from the 2-millisecond control gate generator on lead 93 is applied as an input signal to the feed delay stop gate which is shown in FIGURE 10D at the upper center position. The output signal from left stage on lead 169 is applied as an inhibitor signal to the common cathode conductor 161. In its "no signal" condition, the voltage on lead 169 is approximately a negative 3 volts while the signal during the 5-millisecond gating period is a positive 3 volts. This positive voltage signal is sufficient to prevent conductor 161 from going negative even though a coincidence is registered by all of the anodes of the diodes connected to conductor 161.

The 5-millisecond delay provided by signal on lead 169 is necessary to assure that the mechanical functions of the reperforator and printing unit are completed before the next coincidence position can be detected. During the interim of this 5-millisecond delay, each of the second register storage stages 88 are triggered back to their "no signal" condition by the trailing edge of the 2-millisecond pulse from the 2-millisecond control gate pulse generator output lead 93.

The signal on lead 93 is also applied to the search register stage shown at the upper center of FIGURE 10C. The search register stage is a bi-stable circuit having a voltage output signal at test point (TP) 31 which is shown in FIGURE 13. The positive voltage level of the signal at TP 31 on lead 170 is a positive 3 volts whereas the negative going portion of the signal is a negative 3 volts. The output signal on lead 170 is applied to the common cathode conductor 161 of the "and" gate in the shaft position coincidence detector circuit and is effective to prevent a coincidence detection signal from being indicated when the search register has been triggered by the signal on lead 93 which causes the positive voltage to appear on lead 170.

The search register bi-stable circuit is triggered to its "read-out" condition by the sync input signal on lead 173 which is provided from the receiver-selector when no storage unit is present and from the storage unit when it is used. In FIGURE 10A, the read-out signal on lead 90 is delayed by 50 to 100 microseconds from the read-out signal on lead 82 which causes the signals stored in the first register storage elements 78 to be read out and applied to the second register storage circuits 88 shown in FIGURES 10C and 10D. The sync input signal from lead 90 of FIGURE 10A is then applied to lead 173 shown in FIGURE 10C to thereby trigger the search register to cause the voltage on lead 170 connected to the common cathode conductor 161 to be negative. Since the sync pulse on lead 173 to the search register trails the code element signals which are applied to the second register storage stages, the controller unit is ready to "read-out" by the time the search register triggers to unblock the shaft position coincidence detector circuit.

Summarizing then, an output signal from the shaft position coincidence detector circuit cannot be obtained within the first five milliseconds after a character is indicated and the code rod selected because of the inhibit voltage on lead 169 provided from the feed delay stop gate shown in FIGURE 10D. After this 5-millisecond delay, a coincidence signal still cannot be indicated until the search register is triggered to remove the positive voltage from lead 170. Since the sync input signal on lead 173 to the search register is delayed slightly behind the incoming code signals to the second register storage circuits 88, the search register does not open until after the second register storage stages have received the code elements of the next code character to be processed by the reperforator unit. As soon as the search register has triggered and the positive voltage on lead 170 is removed, the shaft position coincidence detector is ready to provide an output signal as quickly as the code wheel shaft rotates to a position so that the output signals from the pick-up magnets 500–505 register a coincidence with the No. 3, No. 4 and No. 5 code elements of the coded signal then in the second register storage stages 88.

As is apparent from FIGURE 13, at the time period of 2-milliseconds after a coincidence has been indicated by the shaft position coincidence detector, the signal which has been transferred to the mechanical portion of the reperforator unit through the selection of the corresponding code rod element is then discarded from the second register storage stages 88 and any time after the end of this 2-millisecond delay, the second register storage stages 88 are ready to receive the next incoming coded signal.

When the storage unit is used and when the incoming signal comprises two or more characters, which because of their physical position on the code wheel, cannot be selected within the time interval between transmission of the successive code elements so that there is a backlog of characters in the storage unit waiting to be processed by the machine, the next character can be pulled out of the storage unit and applied to the second register storage stages 88 immediately after the search register signal on lead 170 becomes positive. This signal is applied to the storage unit as indicated in FIGURE 10C to thus permit the storage unit to send the next character to be recorded to second register storage stages 88 in the controller unit of FIGURE 10C. Accompanying such signals is a signal on the sync input lead 171 to the search register to thereby trigger the search register to its operating condition again which conceivably could occur before the end of the 5-millisecond feed delay period expires. In that event, the positive voltage on lead 170 to the common cathode conductor 161 of the shaft position coincidence detector will be removed before the positive voltage on lead 169 from the 5-millisecond gate is removed so that immediately upon completion of the 5-millisecond period, the shaft position coincidence detector circuit will be capable of registering the next coincidence, which with a most favorable sequence of letters could be after ⅜ of a revolution of the code wheel shaft 292.

With a favorable sequence of letters, it is possible to process characters through the reperforator and printing unit of the present invention at the rate of over 2 for each rotation of the code wheel shaft 292. This corresponds to a rate of about 160 characters per second.

In FIGURE 15, a timing chart is shown wherein the top row of numbers represents milliseconds during the operation of the machine at its top design speed of 75 operations per second. This chart shows that with the best sequence of characters, the rate of selection is such that every twelfth code bar can be selected which corresponds to a selection of a new character about once every six milliseconds. However, with the worst sequence of characters, the time period between two successive characters may be more than twenty-one milliseconds.

To prevent the loss of any transmitted characters, it is necessary to operate at a rate slower than 50 operations per second, which would correspond to 20-milliseconds per operation. To increase the speed of operation of the present invention to 75 operations per second, which it is capable of doing successfully, a storage unit, of the type that holds the code signals representing the characters received in their proper sequence, is provided to make the code signals available to the second register storage stages 88 at whatever rate the reperforator and printing unit can process the information.

From the foregoing, it is apparent that the output signals from the storage unit may be called for with time intervals between the successive signals varying from 6 milliseconds to 21.5 milliseconds.

At rates of signal transmission less than about 48 operations per second where the storage unit is not used, a coincidence signal cannot be provided from the shaft position coincidence detector so long as the search register stage of FIGURE 10C indicates that there is no signal stored in the second register storage stages 88. Thus the controller unit stands ready to receive signals at any frequency less than the maximum range for which it is designed and thus receive hand typed messages where there may be delays of up to several seconds between successive characters.

AUXILIARY FUNCTIONS

Manual tape feed-out

Tape feed-out is effected through a push button 222 shown in FIGURE 1 which is manually operable to advance the tape for the purpose of removing the tape from the machine after a signal has been received. In FIGURE 10D, the tape feed-out button operates switch contact member 222 to transfer it to its alternate position when it is manually depressed. This applies a negative potential of 4.5 volts on lead 171 to trigger the tape feed-out register to its alternate conduction condition.

The output signal on lead 174 from the tape feed-out register varies from a positive 3 volts to a negative 3 volts on the depression of switch contact 222. When a positive 3 volts appears on lead 174, this voltage is applied to the cathode 175 of the diode 176 having its anode connected to lead 170 on which lead the output signal from the search register appears. When the output signal on cathode 175 is a positive voltage, it does not interfere with the previously described operation of the circuit. However, when the output voltage on lead 175 is a negative 3 volts, this has the effect of removing from lead 170 the positive 3 volts supplied as a blanking or inhibit signal which prevented the shaft position coincidence detector circuit from registering a coincidence during the time intervals when there is no code signal stored in the second register storage stages 88. The effect of the negative 3 volts on cathode 175 is to cancel the inhibit voltage on lead 170 and thus permit the shaft position coincidence detector to register coincidence in its usual manner, assuming the inhibit signal on lead 169 from the 5 millisecond feed delay stop gate is not present.

Since no signal is stored in any of the second register storage stages 88, each is in a space condition and the space-space selector magnet will be energized at the time when the cycle of rotation corresponding to the No. 6 position of the code wheel, which corresponds to all spaces as shown in the chart of FIGURE 6. This will be effective to punch a blank and will advance the tape one position for each revolution of rotation of the code wheel shaft 292.

If an incoming signal appears on the input line at the time when the tape feed-out button is depressed, at the time the signal is being stored in the first register storage stages 78 of the receiver-selector unit shown in FIGURE 10A, output signal from the 35 microsecond delay multivibrator on lead 138 causes the 5 millisecond delay circuit to operate and the output signal on lead 94 of that circuit which comprises a negative going pulse is applied to lead 94 and through the resistor capacitor shown in the upper left-hand corner of FIGURE 10D to lead 171 to thereby immediately trigger the tape feed-out register back to its normal condition. This removes the voltage from lead 175 so that the positive voltage on lead 170 from the search register will stop further output signals from common cathode conductor 161. The shaft position coincidence detector will then be incapable of indicating a further coincidence until after the input signal is applied to the second register storage stages 88 and the search register is transferred so that the positive inhibit voltage on lead 170 is again replaced by the negative voltage permitting the coincidence pulse on conductor 161 to be produced.

By the foregoing combination of circuit elements, the very first incoming signal which is received during a time interval when the manual tape feed-out button is depressed will be processed by the tape perforator unit of the present invention. In the prior machines of this type, the first signal has been used to disenable the manual tape feed-out button control and hence was lost and not printed or punched in the tape.

PRINTER-REPERFORATOR ASSEMBLY

The organization of the assembled mechanical components of the printer-perforator 53 is illustrated in FIGURE 1, to which reference will be made, as necessary, in the following specific description of the various elements. In FIGURE 1, it will be seen that the machine base portion 61 has the shape of a flat rectangular box with support pads 202 located at each of the four corners. Chad drawer 62 is disposed in the forward portion of the base 61 and an upper wall 204 of base 61 provides support for the selector 52, controller 54 and the printer-reperforator subassembly 58. This description will be based on a machine using the standard five-unit Baudot code and having a ⅞ inch wide paper tape recording medium (fan fold recommended). It is to be understood that codes of more or less than five units and other width paper tapes may be utilized in accord with the concepts and teachings of this invention.

Still referring to FIGURE 1, the paper tape 206 enters from the right-hand side of the machine, passes through the perforating and printing section and exits from the left-hand side of machine 50. A dust cover 208, illustrated in phantom lines, covers the upper components 52, 54 and 58 and is secured to the top plate 204 of base portion 61 by thumb screws 210. The front portion 212 of cover 208 is hinged along an upper horizontal edge 214 and includes a window 216 through which the message being printed on tape 206 will be visible to the operator. This hinged front portion 212 can thus be raised to enable access to the operating controls, for any necessary adjustments to the machine and also to enable the tape and ribbons to be serviced. Operator manipulated controls for this machine consist of a power off-on switch 220 and a button type manual tape feed-out switch 222 located on a small panel at the right-hand front side of the reperforator 50. Installation operating controls, such as range, bias, mode selector, line current and fuses can be seen on the front wall of the upper box containing selector 52 and controller 54.

Printer-reperforator assembly 58 is unitarily mounted on a solid base plate 230 which in turn is supported by shock mounts 232 on the machine base top wall 204.

All D.C. and A.C. regulated voltages are supplied through the upper portion of unit 50, i.e., the box which houses the selector 52 and controller 54. Adequate filtering, regulation and isolation are provided to insure reliable operation of the equipment under conditions of line voltage and frequency variations of from 90 to 125 volts A.C., and 50 to 60 cycles per second. Power amplifiers are also provided in unit 50 to operate four code rod selector magnets, two type wheel shift magnets, two ribbon feed clutch magnets and a signal bell magnet.

In accord with the foregoing description, the basic principle of operation for the mechanical punching, printing and feed functions of the reperforator 50 resides in rotation of thirty-two (32) code rods past a reference point (or points having a common time base). Each rod has the mark element or elements of its representative character machined in as interference flanges. To facilitate the high speed aspect, the thirty-two (32) code rods are separated and placed in two code wheels, although it is to be understood that all thirty-two (32) code rods could be utilized in just one wheel or in more than two wheels. However, in the illustrated mechanism, which uses two code wheels, there are sixteen (16) code rods per wheel. Within each code wheel the sixteen (16) rods are arranged in two groups, eight (8) code rods protruding from each end of each code wheel. The aforementioned four code rod selector magnets actually control latches for spring biased selector plungers, one for each group of eight (8) code rods. Each selector plunger is reciprocable in a path parallel with the code rods and aligns with each code rod as the code rods are rotated past the plunger locations.

Each function (print, five-code punch assembly, feed hole punch, punch retraction and tape feed control) has mechanisms enabling operation by code rods in both of the two code wheels. A type wheel rotates above the print hammer, and the two code wheels and the type wheel rotate at 3750 r.p.m.

Whenever the electronic controller, through a received code signal combination, actuates one of the afore-noted magnets MM, MS, SS, SM, the associated selector plunger latch arm will be attracted by the magnet releasing the plunger which moves to an interference condition with the desired code rod. The pop-out plunger hammer moves into the path of the selected rotating rod just before it arrives at its reference or selection point. This causes an impact between the pop-out plunger hammer head and the code rod head experiencing an elastic impact between the two elements with the result that both will be driven away from each other. The pop-out plunger moves back to strike an energy absorbing arm where it will stop and its latch can drop into position holding the selector plunger ready for its next release. The impacted code rod will be driven into the wheel, a distance of 0.05 inch, and will be secured by an associated latch located within the code wheel. In this latched position, the code rod interference flanges engage intermediate transfer arms to operate associated function mechanisms including print hammer, code punches, code punch retractors and feed release pawl. As the rotating wheel carries the code rod on around its path, an internal cam pulls the code rod latch away from the code rod and a second cam shifts the code rod slightly out of the code wheel into a non-interference, normal position ready for another impact positioning operation. The cycle of afore-described functions of a code rod require one revolution of the code wheel.

Tape feed is realized through a sprocket feed wheel which is kept under continuous rotational bias from a motor driven pulley wheel operating through a friction clutch, and a torsion spring drive rod. The tape feed sprocket wheel itself is retained against rotation by a feed release pawl and whenever an operation occurs, the feed release pawl is removed permitting the type wheel feed sprocket to rotate under torsion spring bias. The movement of the feed release pawl is timed to occur in less time than that required by the sprocket feed ratchet wheel to move one tooth (one space of the tape). Therefore the feed release pawl is always back in a position to engage the next tape feed sprocket ratchet tooth before the tape has been fed past its next position.

The ink ribbon is carried on two spools and can be power driven in either direction through a reversing clutch mechanism. The reversing clutch is held in a drive position so long as message code units are being received by the electronic selector. Whenever signals are not received within a one second period, the ink ribbon feed is disengaged and the ribbon becomes stationary. A shift of ink ribbon feed from one direction to the other occurs through a limit switch arrangement whenever one spool is depleted.

Drive power for the code wheels, the type wheel, the coincidence selector, the tape sprocket feed and the ink ribbon feed is derived from an induction type 1/20 horsepower, 115 volt, A.C., 60 to 50 cycle, 3450-2850 r.p.m. motor.

The aforementioned portion of this description provides a brief explanation of the mechanical operation of printer-reperforator 58 and a detailed description of the structure follows. FIGURE 14 illustrates the base plate 230 with most of the mechanical components removed. Toward the rear of base plate 230 a motor mounting bracket 234 is fastened by means of machine screws. The motor will be mounted with its shaft disposed horizontal and extending from front to rear. Located at the right-hand side of motor bracket 234 is a U-shaped bracket 236 used for mounting the coincidence selector 60 so its rotational axis will be disposed parallel to the motor shaft axis. Removable upper caps 238 on the vertical plates of the coincidence selector bracket 236 enable installation and removal of the coincidence selector 60 which has housing end bearings clamped securely in bracket 236.

Rigidly secured near the forward part of base plate 230 is a heavy, machined casting 240 having a thick base 242 and vertical front and rear walls 244 and 246, respectively. A portion of the casting base 242, which is located between the front and rear walls 244 and 246, is depressed to form an oil reservoir 248 for a purpose to be described. On each side edge of rear wall 246 is a half socket 250, similar half sockets 252 also being provided on the side edges of the front wall 244. Each of the two aligned sets of half sockets 250 and 252 receives the rear and front bearing retainers of a code selector wheel. Side retaining plates 245 which include matching half sockets are secured to the sides of the rear and front walls 244 and 246 by machine screws, as can be seen in FIGURE 1, to retain the code wheels in journalled position with their axes parallel to the motor shaft axis.

The rear wall 246 of the code wheel support also includes a pillow block portion 254 which mounts the tape feed sprocket assembly. This pillow block 254 has a removable cap 256 secured by machine screws. A somewhat similar arrangement provides a large top pillow block 258, with its cap 260 secured thereto by machine screws, to mount the type wheel assembly, as will be later described.

Still referring to FIGURE 14, two studs 264 and 266 project vertically in a front and rear aligned relationship adjacent the front and rear casting walls 244 and 246. These studs 264 and 266 are firmly secured in the base of casting 240 and provide mounting support for a shock absorber block 268 and the punch assembly 610.

The afore-described oil reservoir 248 is located under the punch shock absorber block 268 and retains oil used in lubricating the code selector wheels. To accomplish this lubrication, two oil wicks 268 extend upwardly from the reservoir 248, diverge and pass under the positions which will be occupied by the code selector wheels. Oil wicks 268 are biased by leaf springs against a periphery of the code wheels in a manner to be later described and under each code wheel wick is located an oil drip plate 270. The lower ends of these two drip plates 270 are above the top of oil reservoir 248 and both ends include laterally spaced ears 271 through which is projected the shaft of a crank 272 journalled in the front and rear support walls 244 and 246. Cranks 272 are rigidly secured at a mid-portion to the aforenoted leaf springs and, as shown in FIGURE 1, are biased by coil springs 274 in a direction which presses the oil wicks 268 against the peripheries of the code selector wheels.

FIGURE 17 illustrates the power drive train and shows how rotational drive is imparted from the electric motor 280 to the right-hand code wheel 282, the left-hand code wheel 284, the type wheel 286, the coincidence selector 60 and the gearing for the two ribbon spools 288 and 290.

Each of the two code wheels 282 and 284 includes an axial shaft, the shaft 292 of code wheel 282 being longer than the shaft 294 of code wheel 284 (FIGURE 19). Code wheel shaft 292 is in direct alignment with shaft 296 of coincidence selector 60 (FIGURE 26) and is coupled thereto, as will be later described. A double sheave V-belt pulley 298 is non-rotatably secured on the rearwardly projected end of the right-hand code wheel shaft 292. A second double sheave V-belt pulley 300 is non-rotatably secured to the forwardly projected end of motor shaft 302. The two V-belt pulleys 300 and 298 are connected by a single V-belt 304. Front sheaves of the motor pulley 300 and the code wheel pulley 298 constitute a speed-step-up pulley drive from 3450 r.p.m. at the motor to 3750 r.p.m. at the code wheel; and the rear pulley sheaves can be used to constitute a speed-step-up pulley drive from 2850 r.p.m. at the motor shaft to 3750 r.p.m. at the code wheel shaft. Thus code wheel speed can be maintained at 3750 r.p.m. whether the motor is being operated on 60 or 50 cycle A.C. current merely by shifting V-belt 304 from one set of pulley sheaves to the other set. During free running of this equipment without signals being received, operation will be at 3750 r.p.m. However, as soon as signals are being received and printing, punching and other functions are occurring, the drag through the motor drive gearing will result in a code wheel rotation of approximately 3700 r.p.m.

Viewing the dual code wheel assembly from the front of the machine, as shown in FIGURE 18, the right-hand code wheel 282 will be rotating counterclockwise. The left-hand code wheel 284 rotates at the same speed but in a clockwise direction as indicated by the arrow in FIGURE 18. To accomplish this opposite rotation, a helical toothed gear 306 (FIGURE 17) is secured on the right-hand code wheel shaft 292 behind the support rear wall 246 and the left-hand code wheel shaft has secured thereto a second helical toothed gear 308 in meshed engagement with helical gear 306. Both code wheels must rotate in unison, at the same speed and in opposite directions.

In accord with the principle of operation of this machine, type wheel 286 must also rotate at the same rotational speed as code wheels 282 and 284. Type wheel 286 is secured for rotation to a shaft 310 which extends to the rear of casting rear wall 246 and has secured thereto a helical gear 312, having the same diameter and the same number of teeth as helical gears 306 and 308. Drive power is transferred from helical gear 306 through an idler gear 314 to the type wheel shaft gear 312.

Located on the front face of the motor pulley 300 is a round belt pulley sheave 314 which, through a round pulley belt 316 and pulley 318 which is secured to a feed sprocket drive shaft 320 through a friction clutch 322, provides a rotational drive biasing force to the tape feed sprocket 324.

As was previously described, the coincidence selector shaft 296 is positively connected to and is coaxial with the right-hand code wheel shaft 292 and, accordingly, the coincidence selector rotor (FIGURE 26) must rotate at the same r.p.m. as do code wheels 282 and 284. Hence, code wheel position reference signals, developed through the coincidence selector 60, will give positive indication of the rotational relationship of the two code wheels 282 and 284 and the type wheel 286, to any fixed reference point.

Code wheels 282 and 284, their shafts, mounting components and gear assemblies are similar in detail, differing only in the shapes of the individual code rods and in that the right-hand code wheel shaft 292 is the longer shaft, as has been previously described. Accordingly, it is sufficient that only one code wheel be described in detail with reference to FIGURES 19 and 22. The schematic representation shown in FIGURE 18 shows the structural correlation between the two code wheels, the intermediate impact transfer arms and the punches, print hammer, tape feed mechanism and punch retractors.

Shown in FIGURE 19, the code wheel assembly includes shaft 292, the right-hand end of which has two ball bearing type, sealed bushings 358 and 359 retained against a shoulder 360 on shaft 292 by washer 362 and a split ring washer 364. A sleeve-like bearing retainer 366 is assembled from the rear of bearings 358 and 359 and provides a surrounding sleeve over both of the bearing assemblies.

The inner end of the bearing retainer 366 has a smaller diameter bore 368 than the outer diameter of the bearings 358 and 359 and receives a cylindrical extension 370 of a front code wheel cam member 372. Cam member 372 has a flat formed on its end extension 370 which is disposed in bore 368, the cam member 372 being secured to the retainer sleeve 366 and non-rotatably maintained in position by a set screw 374 tightened against the flat. Retainer sleeve 366 fits into the half socket 252 located on the right-hand side of the front support wall 244 and is clamped in position, as shown in FIGURE 1. Code wheel 282 is secured to shaft 292 adjacent the cam plate 372, as will be described in more detail with reference to FIGURE 22 hereinbelow. To the rear of code wheel 282 is a second cam member 378 which has a cylindrical end extension 380 disposed in a bore 382 in a rear bearing retainer sleeve 384. The cam member 378 is non-rotatably secured in retainer bore 382 by a set screw 386. Rear retainer 384 also carries a sealed ball bearing bushing 388.

The rear bearing retainer 388 fits in the half socket 250 of the rear code wheel assembly support wall 246 and is clamped therein in a manner similar to that for the front bearing retainer 366. Independent rotational adjustment of either the front or the rear cam members 372 and 378 can be made after assembly by rotation of the retainer sleeves 366 and 384 within their respective sockets. Set screws (not shown) are provided in the front and rear walls for positively maintaining the rotational positioning of retainer sleeves 366 and 384, once the cam members 372 and 378 are adjusted. To the rear of bearing 388, a spacer sleeve 390 is disposed on the shaft 292 and the afore-described helical gear 306 is placed on shaft 292 against spacer 390 and non-rotatably secured by set screw 392.

FIGURE 22 shows code wheel 282 as disposed on shaft 292 between and during operation will rotate free of the non-rotating front and rear cam members 372 and 378. The body of code wheel 282 is a cylindrical block 394 having two axially spaced diametrical bores 396 and 397 through which pins 398 can be driven into matching diametrical bores 399 and 400 in code wheel shaft 292 to non-rotatably secure the cylindrical code wheel block 394 to the drive shaft 292. Adjacent the peripheral portion of cylindrical block 394 are sixteen (16) axial through bores 402 spaced at 22.5° equiangular positions. These axial bores 402 constitute code rod receptacles or carriers. Around the cylindrical surface of the code wheel block 394 are formed circular, radially directed, annular, combing grooves 404, 405, 406, 407, 408, 409, 410, 411 and 412. For purposes of correlation in the functioning of this apparatus, the first groove 404 (rear groove) will be termed the tape feed groove; the second groove 405 is the code punch retractor groove; grooves 406–411 are punch grooves, 408 being the feed punch groove; and groove 412 is the print hammer groove. Radially intersecting each of the axial code rod bores 402 are two radial bores 414 and 416. The larger bores 414 extend from the circumferential surface of the code wheel block 394 through to the axial shaft bore while the smaller radial bores 416 terminate just radially inward of the axial code rod bore 402 and serve as oil holes. Each of the larger radial bores 414 contains a code rod latch pin 418 which is biased outwardly by a coil spring 420 having one end abutting the code wheel shaft 292. Alternate code rod bores have the cross radial bores 414 and 416 located at opposite ends of the code wheel block 394, the reason being that alternate code rod bores 402 receive code rods inserted from opposite ends of the code wheel block to form two groups of eight (8) code rods, each of which rods will be located 45° apart.

Each end face of the code wheel block 394 has a coaxial axially directed circular groove which intersects each of the radial bores 414 located adjacent the respective end of the code wheel block. Front axial groove 422 provides a recess for an axially directed radial cam flange 426 carried by the front cam member 372. This axial cam flange 426 extends into recess notches 428 formed intermediate the ends of each of latch pins 418. The cam flange becomes thinner and the radial camming surface of axial cam flange 426 is formed to permit the latch pin 418 to move radially outward a distance sufficient to latch its associated code rod in impacted position whenever the code rod is shifted to an operative position. During a further phase of rotation of the code wheel block 394, during which the pins 418 pass around the cam flange 426, a thick camming surface of flange 426 coacts against the lower surface of the latch pin groove 428 withdrawing latch pin 418, against the bias of its spring 420, radially inward in the latch pin bore 414 to a position where latch pin 418 no longer interferes with its associated code rod. As the code wheel block 394 rotates through one complete cycle, each of the eight (8) code rod latch pins 418, which coact with the axial cam flange 426, are moved past the cam surface which, if required, can withdraw the latch pins 418 from a latching position (see timing chart, FIGURE 16). A similar, axially directed radial cam flange 430 is located on the rear cam member 378 and extends into the radial end groove 424 on the rear face of the code wheel block 394. Cam flange 430 cooperates with the rear set of latch pins 418 in the same manner as that described between front cam flange 426 and the front set of latch pins 418. Note: the front axial cam flange 426 and front latch pins 418 coact with the eight (8) code rods which extend rearwardly from the code wheel block 394 whereas the rear axial cam flange 430 and rear latch pins 418 coact with the eight (8) code rods which project from the front face of the code wheel block 394.

FIGURE 23 is a scaled and dimensional drawing illustrating the exact dimensions of a code rod 440 from an operative example of this invention. There are thirty-two (32) of the code rods 440, each of which has a different permutated arrangement of annular flanges spaced axially along its length, made of surface hardened steel. Each of the code rods includes a beveled impact head 442, a narrow positioning limit flange 444 spaced slightly behind head 442, a front guide and interference land 446 and a rear guide land 448. Between the front and rear guide lands 446 and 448 are located a wide flange 450 adjacent land 446 and a second wide flange 452 adjacent the rear land 448. In equally spaced disposition between the front flange 450 and rear flange 452, there will be from one to six thin interference flanges 454, 455, 456, 457, 458 and 459. The annular groove between the rear piloting land 448 and the rear wide flange 452 constitutes the code rod latch recess 460 into which an associated latch pin 418 will be biased by its spring 420 whenever a code rod is selected and shifted inwardly to an operative position in the code wheel block 394. Note: when a code rod is shifted to an operative position as illustrated by the lower code rod in FIGURE 22, the positioning flange 444 will abut the end face of code wheel block 394 and the latching recess 460 will be aligned with the latch pin bore 414.

Between the code rod impact head 442 and its positioning flange 444 is a grooved camming recess 462. A radially directed axial cam flange 464 formed on the front cam member 372 extends partially into the camming groove 462 of each of the eight (8) code rods 440 which have their heads 442 extending from the front face of the code wheel block 394. As is shown in the code bar timing chart of FIGURE 16, if a code rod 440 has been impacted into an operative position and latched by its associated latch pin 418, the latch pin 418 at a subsequent phase in the cycle of rotation of code wheel block 394 will be withdrawn from latching engagement by the axially directed radial cam flange 430 and immediately after this withdrawal of latch pin 418, an axially disposed cam rise on the radially directed cam flange 464 will engage the rear face of code rod head 442 to cam the code rod back to its inoperative normal position which will be determined by abutment of the positioning flange 444 against the rear face of the radially directed cam flange 464. The cam rise 466 on cam flange 464 can be clearly seen in FIGURE 32. Whenever a code rod 440 is in its normal inoperative position, its associated latch pin 418 cannot enter the recess 460 due to abutment of pin 418 against the surface of the rear code rod land 448. Such a relationship is illustrated by the upper code rod 440 in FIGURE 28.

Turning again to FIGURE 23, it will be seen that the code rod 440 therein illustrated includes all six (6) of the narrow interference flanges 454–459 disposed between the wide flanges 450 and 454. This constitutes a code representation for the "Letters shift" code signal combination from the Baudot telegraph code. If the "Letters" code rod 440 were visualized as taking the place of the lower code rod 440 shown in FIGURE 22, it will be seen that the rear portion of front pilot land 446 is in an interference position in annular groove 404 of the code wheel block 394; the front wide flange 450 is in an interference position with the code wheel groove 405; interference flange 454 is in an interference position in groove 406; flange 455 interferes in groove 407; flange 456 interferes in groove 408; flange 457 interferes in groove 409; flange 458 interferes in groove 410; flange 459 interferes in groove 411; and the rear portion of wide flange 452 interferes in groove 412. The various interference portions of the front and rear code rods are reversed with respect to the code wheel grooves 404–412.

Seen in FIGURE 18, a series of impact transfer lever arms ride in the manner of a comb in each of the grooves 404–412 of both of the rotating code wheel blocks 394 and the transfer levers correspond to the various functions noted for the series of grooves 404–412. If a code rod has been positioned to an operative position within the code block, any portion of that code rod which shifts into an interference position in an associated groove 404–412 will impact the lever which rides in that groove and cause the lever to transfer the impact power to some associated mechanism such as the code punches and the print hammer. If any specific lever must remain idle during the transfer of the code symbol represented by the selected code rod 440, then that portion of the code rod 440 which would normally move into interference with a combing groove, in which the lever not to be actuated is disposed, must be eliminated. This is accomplished by removing desired ones of the small interference flanges 450–459 or a rear portion of the front pilot land 446, for example, see the code rod in FIGURE 24 for the "Figures shift" code combination, wherein the interference portion of the front land 456 has been removed.

All of the thirty-two (32) individual and different code rods 440 are illustrated in FIGURES 24 and 25. In FIGURE 24, the code rods which have their head ends facing toward the left constitute the group of eight (8) code rods in the left-hand code wheel which project from the forward face of the code wheel and all of the code symbol combinations represented by these eight (8) code rods have the first two code impulses designated as "mark-mark." The eight (8) code rods in FIGURE 24 which have their head ends facing toward the right-hand side are disposed in the left-hand code wheel with their head ends projecting from its rear face and the code symbol combinations represented by these code rods have the first two characters starting with space-mark. In FIGURE 25, the code rods extending toward the left represent those eight (8) code rods which are located in the right-hand code wheel with their head ends extending from the forward face and represent the code symbol combination, the first two impulses of which are mark-space. The code rods in FIGURE 25 which face toward the right constitute those eight (8) code rods in the right-hand code wheel having their head ends extending from the rear face and represent code symbol combinations, the first two impulses of which are space-space.

Since the thirty-two (32) code rods 440 are divided into groups of eight (8) and each group is equally angularly spaced around a code wheel block, a device for determining eight (8) rotational phase positions can be used to determine a specific selection position (1) at the front of the left-hand code wheel, (2) at the rear of the left-hand code wheel, (3) at the front of the right-hand code wheel and (4) at the rear of the right-hand code wheel. Thus a single coincidence selector can provide simultaneous selection points for each of the four groups of code rods, and thus enable identification of all thirty-two (32) code rods as the code wheels rotate past the selection points. This rotational code wheel position identification is determined through the aforementioned coincidence selector 60 which is aligned with and mounted directly behind the right-hand code wheel 282.

In FIGURES 26–30, coincidence selector 60 is a rotational phase position transmitter and includes a stator bell 470 and a rotor 472. The stator bell 470 has a coaxial circular boss 474 extending from its left-hand end. Boss 474 is rigidly secured in one of the arms of support bracket 236. The open end of stator bell 470 is closed by a cover plate 476 which has a second coaxial cylindrical boss 478 extending therefrom and clamped in the other arm of bracket 236. A coaxial bore extends through the circular boss 274 and receives an oil circulating bearing member 480. A blind bore in the end plate boss 478 also includes an oil circulating type bearing 482. Rotor 472 is non-rotatably secured to a shaft 484, one end of which is journalled in the stator end plate bearing 482 and the opposite end of which projects through front bearing 480 and terminates in shaft extension 296 which, as has been previously described, is directly aligned with and coupled to the right-hand code wheel drive shaft 292.

Axially formed in rotor block 472 are elongate slots 486 angularly spaced at 45° increments about the circumference of the rotor 472. Slots 486 extend the entire length of the rotor block 472 and provide receptacles for small permanent steel magnets 488a through 488(l). Magnets 488 are maintained in desired position by set screws 490. With reference to FIGURES 28, 29 and 30, it will be seen that magnets 488 are disposed in three axial groups on the rotor 472, magnets 488a, 488b, 488c and 488d being arranged in 90° spaced disposition within one group (FIGURE 30); magnets 488e, 488f, 488g and 488h being disposed in an intermediate angularly related group as indicated in FIGURE 29; and magnets 488i, 488j, 488k and 488(l) being disposed in a third angularly related group as indicated in FIGURE 29. The inner circumferential surface of stator 470, which surrounds the rotor 472, is provided with five (5) axially disposed grooves 492, 493, 494, 495, and 496, spaced at 45° increments within a 180° semi-circular portion of stator 470. These grooves 492–496 provide receptacles for mounting induction coil pick-up heads 500, 501, 502, 503, 504 and 505. Two pick-up heads are utilized for each group of four (4) permanent magnets arranged as indicated in FIGURES 28, 29 and 30. When pick-up heads 500–505 have been properly axially positioned, they are secured by a plastic material such as "epoxy resin" which is poured in the axial grooves 492–496 while in a liquid state to subsequently harden and maintain the heads in desired positions. The electric leads of all the pick-up heads 500–505 pass out through the rear of the coincidence selector 60 and are gathered in a junction box 508 mounted on top of the stator 470.

Because of the arrangement of the permanent magnets 488a through 488(l) grouped as described, there will be eight (8) different three-unit simultaneous code signal combination impulses corresponding to the eight 45° incremental positions of rotation of the two code wheels 282 and 284. Referring to FIGURE 5 and the chart of FIGURE 6, the eight (8) code signal combinations which develop in the induction pick-up heads as the rotor 472 rotates 360° are depicted. As has been described, the electronic controller 54 will determine when the one of the eight (8) code wheel angular positions, where the four (4) code rods having the last three code characters which correspond to the last three code characters of an incoming code signal received by the electronic convertor 52 apparatus, is at a selection point. In FIGURE 2, the four (4) code rods representing "Letters," "X," "V" and "M" are simultaneously at the selection points of their respective groups of eight (8) code rods. In FIGURE 6, it will be seen that all of these four code representations have mark-mark-mark impulses as their last three impulses. Note also that the number 1 position is represented in FIGURE 5 where permanent magnets 488i, 488e and 488a induce current flow in the three (3) mark pick-up heads 504, 502 and 500. At the precise angular position when this signal coincides with the similar last three-unit electrical code impulse signals in the controller 54, an input signal is applied to the "and" gates for all four (4) selector current amplifier circuits, as previously described. Note: the first two code impulse signals of the received code combination serve as another input to the "and" gate of the one and only one of the four (4) code rod selector magnets, and that will be the only selector magnet that is energized upon coincidence of the rotational phase of the code wheels with the corresponding last three (3) impulses of incoming received code signal combination. Therefore, even with four (4) different selection points, only one of the four magnets will be energized when the code wheel phase relationship matches the last three (3) impulses of a received code signal combination.

When the selected one-out-of-four code rod selector magnets MM, SM, MS, SS is energized, a selector plunger is released just ahead of the rotational path of the impact head of the desired code rod. As illustrated in FIGURE 2, the front set of code rods in each code wheel is offset 22°30' from the rear group of code rods, and relative to the other groups in the other code wheel, the spacing between each of the four groups is 11°15'. This offset actually does not constitute a problem insofar as the location of the code selector plungers is concerned, since that is only a mechanical problem of offsetting the magnets. Note: that all thirty-two (32) code rods in FIGURE 2 could be located in one wheel with each rod spaced 11°15' from its neighboring rods. Also all rods could be selected from the front or the rear of the code wheels if desired.

Referring now to FIGURES 31–37, the code rod selector plunger latch and magnet release mechanism will be described. Since all four (4) of the plungers, latches and magnets are essentially identical, only the assembly on the front side of the right-hand code wheel 282 will be described. The side plate 245 which is secured to the right-hand side of front wall 244 provides the mounting support for the "mark-space" code rod selector plunger 520. The three (3) other plungers are shown in the schematic representation of FIGURE 2, as "mark-mark" plunger 521, "space-mark" plunger 522 and "space-space" plunger 523.

Plunger 520 (FIGURE 36) is made of cold rolled steel, heat-treated and phosphate-coated before the hardened steel ball 526 is secured in end socket 528 by lightly spinning the edges of the socket. Ball 526 should spin freely within socket 528 and is the portion of plunger 520 which engages the impact head 442 in side support plate 245 and is disposed parallel with the axis of rotation of code wheel 282 and in direct alignment with the circular path through which the code wheel rotates all of code rods 440. The opposite end 532 of plunger 520 is slightly convex to act as a recoil abutment surface, as will be described. Closely adjacent the convex recoil abutment end 532 is an annular groove 534 and an intermediate portion of rod 520 is formed with a deep annular latch receiving recess 536. Plunger rod 520 is guided for axial reciprocation in a plunger bearing 538, which is secured by means of an ear 540 and a screw 542 to the side plate 245. A notch 544, cut in the side of bearing 538, provides access for the latch end 546 of a plunger latch arm 548. When the end 546 of latch arm 548 extends through the notch 544 and is biased against the plunger 520, it will be disposed within the latch recess 536 and the plunger will be retained in the retracted position illustrated in FIGURE 33. A split ring fits within the annular groove 534 adjacent the convex abutment end 532 of plunger 520 and determines the operative limit position of plunger 520 when latch 548 is withdrawn from a latching position and a spring plate 550, which engages the abutment end 532 of plunger 520, biases the plunger into operative position, which, as previously described, will be just immediately in front of and in the rotational path of the selected code rod impact head 442.

Latch arm 548 (see FIGURE 37) is pivotally secured to a support shaft 552 which extends through a structural member 554 secured to side plate 245. Shaft 552 is freely journalled within the structural member 554 but is prevented from any axial play by a locator stud 556 which in turn is locked in position by a set screw 558. The opposite end of shaft 552 has rigidly secured thereto a dog-legged member 560, the lower arm 562 constituting an anchor member for biasing spring 564 which is secured to a spring post 566 mounted on side plate 245. Biasing spring 564 creates a force tending to move latch 548 into engagement through the plunger bearing notch 544 with the latch recess 536 in plunger 520. The up-standing arm 568 of dog-leg 560 constitutes a stop abutting against a structural member and determines the limit of the release position of latch arm 548.

Rigidly secured on latch arm 548 is an armature disc 570 (see FIGURES 31 and 35) which is disposed immediately in front of the pole face of an electro-magnet MS. Electro-magnet MS is clamped in position by member 554 and end plate 572, both of which are secured by machine screws to the side plate 245. As can clearly be seen in FIGURE 30, when electro-magnet MS is energized, the armature disc 570 will be attracted to move latch arm 548 in a clockwise direction removing latching end 546 from the plunger recess 532 permitting the plunger to move to an operative position under bias of spring 550, as shown in FIGURE 34. Inasmuch as the electro-magnet is only momentarily energized, the armature disc 570 will be, in effect, immediately released and latch arm 548 immediately returns in a counterclockwise rotation under force of the spring 564 so that, as soon as plunger 520 shifts to its inoperative position, as shown in FIGURE 33, the end 546 of latch arm 548 will immediately drop into latching position and prevent return of plunger 520 to its operative position.

Insofar as is possible, the mass of plungers 520 is approximately equal to the mass of a code rod 440. Whenever a plunger is released by a momentary signal to its associated magnet, it will move into the path of the selected code rod 440 just before that code rod arrives at its reference selection point. The code rod impact head 442 will experience an elastic impact with the plunger ball 526 and both will be driven away from each other by reaction force. The plunger 520 rebounds until its abutment end 532 pushes the spring plate 550 into engagement with an energy-absorbing plate 574. The energy-absorbing plate 574 is carried by a spring leaf 576 and has a moment substantially equal to the mass of the plunger 520 so that it will absorb the rebound energy of plunger 520 causing the plunger 520 to stop, without a subsequent rebound, to thereby permit the latch end 546 of latch arm 548 to quickly drop into the plunger latch recess 536. The energy-absorbing plate leaf spring 576 is secured to a bracket 578 which is fastened by screws to the upper magnet clamping block 572 and thereby also secures the plunger spring plate 550 to the magnet clamping end plate 572. Member 575 is a position limit stop for plate 574.

MECHANISMS OPERATED BY A SELECTED CODE ROD

The general organization of the two oppositely rotating code wheels 282 and 284 with the relative relationship of the other printing and perforating components is clearly shown in the somewhat schematic showing of FIGURE 18. Therein it is seen that the two code wheels are arranged with their axes parallel and in side-by-side relationship. Between the circumferential portions of the two code wheels 282 and 284 is disposed a block shaped shock absorber assembly 580. Disposed slightly above the shock absorber block 580 is a dual assembly of intermediate transfer arms, the duplicate components of which provide identical combing and interference coaction with both of the code wheels 282 and 284.

The means by which transfer of the code representations from any selected code rod 440 in either code wheel 282 or 284, to the various mechanisms such as punches, feed release mechanism, punch retractors and print hammer is fully described in detail in the aforenoted parent application Serial No. 829,446.

The invention may be embodied in other specific forms without daparting from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. For use in combination with a telegraph receiving apparatus having a receiver control device and a rotatable operating section, a coincidence selector for correlating rotational selection points from the operating section with electrical coded signal impulse groups received in the receiver control device comprising: means providing plural axially spaced planar groups of permanent magnets, and a corresponding plurality of axially spaced planar groups of induction pick-up heads disposed adjacent the associated ones of said planar magnetic groups so that relative movement between each group of magnets and its associated group of pick-up heads results in an impulse being generated in each head of said associated group whenever a magnet of the associated group is relatively moved past the associated group of heads; and means to cause relative rotation between said groups of magnets and said groups of pick-up heads directly correlated with rotation of said rotatable operating section; said magnets and pick-up heads being disposed relative to each other in a different angular relationship in each group whereby a rotational cycle of the planar magnetic groups is divided into a multiplicity of different equiangular signal positions with an equal number of code signal groups having impulses equal in number to said plurality of planar groups generated for the respective multiplicity of positions.

2. For use in combination with a telegraph receiving apparatus having a receiver controller section and a rotatable operating section, a coincidence selector for correlating rotational selection points from the operating section with electrical coded signal impulse groups received in the receiver controller section comprising: means providing three planar groups of permanent magnets, and three planar groups of induction pick-up heads disposed adjacent the said three planar magnetic groups; means to cause relative rotation of said magnets and said pick-up heads; said magnets and said pick-up heads being angularly spaced apart about a common axis in different arrangements in each of said planar groups, the angular spacing between magnets and between pick-up heads being multiples of 45° whereby the cycle of rotation of the planar magnetic groups is divided into eight equiangular signal positions with eight different three-unit code signals generated for the respective eight positions.

3. For use in combination with a telegraph receiving apparatus having a receiver controller section and a rotatable operating section, a coincidence selector for generating and transmitting signals correlating rotational selection points from the operating section with electrical coded signal impulses received in the receiver controller section comprising: a rotor member carrying three axially spaced planar groups of four permanent magnets angularly spaced from each other in multiples of 45°; a stator carrying three planar groups of two induction pick-up heads disposed adjacent the paths of rotation of said three planar magnet groups and angularly spaced from each other in different multiples of 45°, whereby the cycle of rotation of the planar groups of magnets is divided into eight equi-angular signal positions with a different three-unit code signal generated for each of the respective eight positions.

4. Apparatus for detecting any one of a plurality of predetermined angular positions of a rotating wheel shaft comprising three signal detection channels each having a plurality of permanent magnets mounted to turn with said wheel and a pair of fixed independent pick-up devices with coils spaced about the wheel periphery, and each of the magnets in a specific channel moving past and inducing a signal impulse in all pick-up device coils of the associated channel during each rotational cycle; the permanent magnets and the pick-up coils being disposed in different physical displacements in each of the different channels to provide different induced impulse signal combinations for each of the predetermined positions.

5. Apparatus as defined in claim 4, together with an electronic circuit matrix, means for applying a coded signal to said matrix to provide a voltage pattern in said matrix determined by said coded signal; an "and" gate; means connecting each of said pick-up coils between different points in said matrix and separate input terminals on said "and" gate to thereby register an output coincidence signal from said "and" gate when the instantaneous position of said shaft corresponds to the coded signal applied to said matrix.

6. Apparatus as defined in claim 5, together with means for supplying an "inhibit" input signal to said "and" gate responsive to an output coincidence signal therefrom until a second coded signal is applied to said matrix.

References Cited by the Examiner
UNITED STATES PATENTS

| | | | |
|---|---|---|---|
| 2,784,397 | 3/1957 | Branson et al. | 340—347 |
| 2,901,170 | 8/1959 | Poole | 340—347 |
| 2,938,198 | 5/1960 | Berman et al. | 340—347 |
| 2,982,951 | 5/1961 | Dirks | 340—347 |
| 3,041,598 | 6/1962 | Betts | 340—347 |

NEIL C. READ, *Primary Examiner.*

T. A. ROBINSON, *Assistant Examiner.*